United States Patent
Su et al.

(10) Patent No.: US 11,895,291 B2
(45) Date of Patent: Feb. 6, 2024

(54) METHOD AND APPARATUS OF VIDEO CODING USING BI-DIRECTIONAL CU WEIGHT

(71) Applicant: MEDIATEK INC., Hsinchu (TW)

(72) Inventors: Yu-Chi Su, Hsinchu (TW); Ching-Yeh Chen, Hsinchu (TW); Zhi-Yi Lin, Hsinchu (TW); Tzu-Der Chuang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/056,111

(22) PCT Filed: May 23, 2019

(86) PCT No.: PCT/CN2019/088069
§ 371 (c)(1),
(2) Date: Nov. 17, 2020

(87) PCT Pub. No.: WO2019/223746
PCT Pub. Date: Nov. 28, 2019

(65) Prior Publication Data
US 2021/0211644 A1    Jul. 8, 2021

Related U.S. Application Data

(60) Provisional application No. 62/743,014, filed on Oct. 9, 2018, provisional application No. 62/742,476, filed
(Continued)

(51) Int. Cl.
H04N 19/105    (2014.01)
H04N 19/159    (2014.01)
(Continued)

(52) U.S. Cl.
CPC ......... *H04N 19/105* (2014.11); *H04N 19/159* (2014.11); *H04N 19/176* (2014.11); *H04N 19/51* (2014.11)

(58) Field of Classification Search
CPC ..... H04N 19/105; H04N 19/159; H04N 19/52
See application file for complete search history.

(56) References Cited

U.S. PATENT DOCUMENTS 9,473,787 B2     10/2016  Arimura et al.
2013/0188715 A1   7/2013  Seregin et al.
(Continued)

FOREIGN PATENT DOCUMENTS

CN    102860006 A    1/2013
CN    105432084 A    3/2016
(Continued)

OTHER PUBLICATIONS

Yang, Haitao; Liu, Shan; Zhang, Kai; "Description of CE4: Inter prediction and motion vector coding"; JVET-J1024r2; Apr. 20, 2018; Joint Vidoe Experts Team (JVET) of IT-T SG 16 WP 3 and ISO/IEC JTC 1/SC29/WG11 (Year: 2018).*
(Continued)

*Primary Examiner* — Jeremiah C Hallenbeck-Huber
(74) *Attorney, Agent, or Firm* — McClure, Qualey & Rodack, LLP

(57) ABSTRACT

A method and apparatus of encoding or decoding for a coding system, where bi-directional CU (coding unit) weighting (BCW) is enabled for the coding system to allow using multiple pairs of weights, are disclosed. According to this method, a Merge candidate list is generated for the current block, where current bi-directional CU weights for a bi-directional predictor of the current block associated with a target Merge candidate in the Merge candidate list are set to a pre-define pair of weights when the target Merge
(Continued)

candidate corresponds to a selected Merge candidate. In another method, current bi-directional CU weights for a bi-directional predictor associated with a target Merge candidate in the Merge candidate list are inherited from the target Merge candidate when the target Merge candidate corresponds to a selected Merge candidate.

2 Claims, 12 Drawing Sheets

Related U.S. Application Data on Oct. 8, 2018, provisional application No. 62/719,826, filed on Aug. 20, 2018, provisional application No. 62/675,239, filed on May 23, 2018.

(51) Int. Cl.
*H04N 19/176* (2014.01)
*H04N 19/51* (2014.01)

(56) References Cited

U.S. PATENT DOCUMENTS

| | | | | |
|---|---|---|---|---|
| 2014/0233651 A1* | 8/2014 | Nakamura | ............ | H04N 19/51 375/240.16 |
| 2017/0064299 A1 | 3/2017 | Rusert et al. | | |
| 2018/0139469 A1 | 5/2018 | Lainema | | |
| 2018/0184117 A1* | 6/2018 | Chen | .................... | H04N 19/109 |
| 2018/0332298 A1* | 11/2018 | Liu | ...................... | H04N 19/577 |
| 2019/0230350 A1* | 7/2019 | Chen | .................... | H04N 19/573 |
| 2019/0230364 A1* | 7/2019 | Lee | ...................... | H04N 19/119 |

FOREIGN PATENT DOCUMENTS

| | | |
|---|---|---|
| CN | 107710762 A | 2/2018 |
| WO | 2017/157259 A1 | 9/2017 |
| WO | 2017/197146 A1 | 11/2017 |

OTHER PUBLICATIONS

International Search Report and Written Opinion dated Aug. 5, 2019, issued in application No. PCT/CN2019/088069.
Chinese language office action dated Jul. 10, 2020, issued in application No. TW 108117805.
Partial Supplementary European Search Report dated Aug. 8, 2022, issued in application No. EP 19806962.7.
Bordes, P., et al.; "Description of SDR, HDR and 360° video coding technology proposal by Qualcomm and Technicolor-medium complexity version;" Joint Video Experts Team (JVET) of ITU-T SG 16 WP 3 and ISO/IEC JTC 1/SC 29/WG 11; Apr. 2018; pp. 1-84.
Chen, Y., et al.; "Description of SDR, HDR and 360° video coding technology proposal by Qualcomm and Technicolor—low and high complexity versions;" Joint Video Experts Team (JVET) of ITU-T SG 16 WP 3 and ISO/IEC JTC 1/SC 29/WG 11; Apr. 2018; pp. 1-44.

* cited by examiner

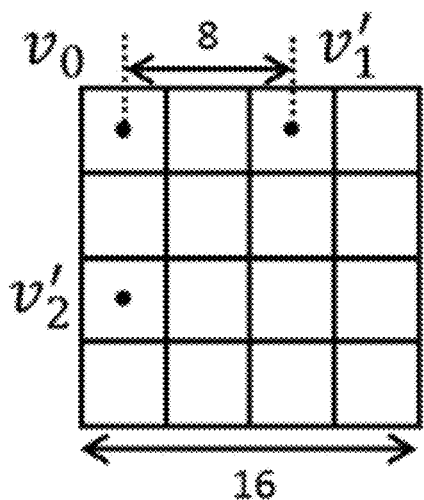 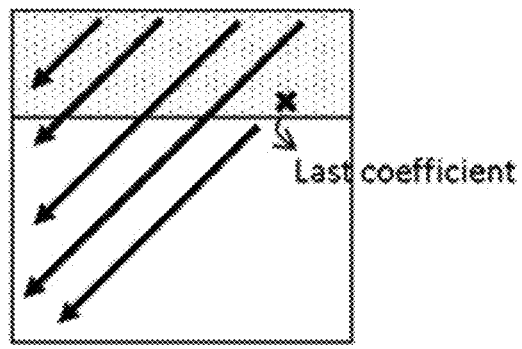
*Fig. 16*     *Fig. 17*
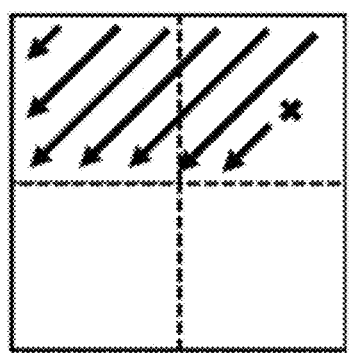
*Fig. 18*

METHOD AND APPARATUS OF VIDEO CODING USING BI-DIRECTIONAL CU WEIGHT

CROSS REFERENCE TO RELATED APPLICATIONS

The present invention claims priority to U.S. Provisional Patent Application, Ser. No. 62/675,239 filed on May 23, 2018, U.S. Provisional Patent Application, Ser. No. 62/719, 826 filed on Aug. 20, 2018, U.S. Provisional Patent Application, Ser. No. 62/742,476 filed on Oct. 8, 2018, 2018 and U.S. Provisional Patent Application, Ser. No. 62/743,014 filed on Oct. 9, 2018. The U.S. Provisional Patent Applications are hereby incorporated by reference in their entireties.

FIELD OF THE INVENTION

The present invention relates to video coding using bi-directional prediction. In particular, the present invention discloses methods related to syntax design associated with bi-directional CU weights.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

Merge Mode

To increase the coding efficiency of motion vector (MV) coding in HEVC, HEVC has the Skip and Merge modes. Skip and Merge modes obtain the motion information from spatially neighbouring blocks (spatial candidates) or a temporal co-located block (temporal candidate). When a PU is Skip or Merge mode, no motion information is coded. Instead, only the index of the selected candidate is coded. For Skip mode, the residual signal is forced to be zero and not coded. In HEVC, if a particular block is encoded as Skip or Merge, a candidate index is signalled to indicate which candidate among the candidate set is used for merging. Each Merged PU reuses the MV, prediction direction, and reference picture index of the selected candidate.

For Merge mode in HEVC reference software HM-4.0, as shown in FIG. 1, up to four spatial MV candidates are derived from $A_0$, $A_1$, $B_0$ and $B_1$, and one temporal MV candidate is derived from $T_{BR}$ or $T_{CTR}$ ($T_{BR}$ is used first, if $T_{BR}$ is not available, $T_{CTR}$ is used instead). Note that if any of the four spatial MV candidates is not available, the position B2 is then used to derive MV candidate as a replacement. After the derivation process of the four spatial MV candidates and one temporal MV candidate, removing redundancy (pruning) is applied to remove redundant MV candidates. If after removing redundancy (pruning), the number of available MV candidates is smaller than 5, three types of additional candidates are derived and are added to the candidate set (i.e., candidate list). The encoder selects one final candidate within the candidate set for Skip, or Merge modes based on the rate-distortion optimization (RDO) decision, and transmits the index to the decoder.

Hereafter, both Skip and Merge modes may be referred as "Merge mode" for convenience. In other words, the "Merge mode" in this disclosure hereafter may mean both Skip and Merge mode.

Merge Mode and AMVP Mode

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 1 shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

Generalized Bi-Prediction (GBi)

Generalized bi-prediction (GBi) is proposed in JVET-O0047 (C. Chen, et al., "Generalized bi-prediction for inter coding", in Joint Video Exploration Team (WET) of ITU-T SG 16 WP 3 and ISO/IEC JTC 1/SC 29/WG 11, 3rd Meeting: Geneva, CH, 26 May-1 Jun. 2016, Document: WET-00047). The concept of GBi is to allow the use different weights for predictors from L0 and L1, respectively, instead of using equal weights in traditional bi-prediction. The predictor generation can be summarized in Eq. (1) and (2).

$$P_{TraditionalPred} = (P_{L0} + P_{L1} + \text{RoundingOffset}) >> \text{shiftNum} \quad (1)$$

$$P_{GBi} = (w_0 * P_{L0} + w_1 * P_{L1} + \text{RoundingOffset}_{GBi}) >> \text{shiftNum}_{GBi}. \quad (2)$$

In the above equations, $P_{TraditionalPred}$ and $P_{GBi}$ are final predictors for traditional bi-prediction and GBi respectively, $P_{L0}$ and $P_{L1}$ are predictors from L0 and L1, $w_0$ and $w_1$ are selected GBi weights for L0 and L1, and RoundingOffset, shiftNum, RoundingOffset1, and shiftNum1 are used to normalize the final predictors in traditional bi-prediction and GBi respectively. For AMVP mode (i.e., normal Inter prediction mode), the weight selection in GBi is explicitly signalled for one CU if this CU is coded in the bi-prediction mode. For Merge mode, the weight selection is inherited from the Merge candidate.

In JVET-D0102 (C. Chen, et al., "EE3: Generalized bi-prediction", in Joint Video Exploration Team (WET) of ITU-T SG 16 WP 3 and ISO/IEC JTC 1/SC 29/WG 11, 4th Meeting: Chengdu, CN, 15-21 Oct. 2016, Document: WET-D0102), the weights of $w_0$ and $w_1$ are {6, 5, 4, 3, 2} and {2, 3, 4, 5, 6}, and the binarization for the case that mvd_l1_zero_flag is equal to 0 is shown in Table 1, where mvd_l1_zero_flag equal to 1 indicates that the mvd of list 1 is set to zero and not sent to the decoder.

TABLE 1

| GBi Index | GBi Coding Order Index | Weighting: { $w_0$, $w_1$ } | Binarization |
|---|---|---|---|
| 0 | 4 | { 6, 2 } | 0000 |
| 1 | 2 | { 5, 3 } | 001 |
| 2 | 0 | { 4, 4 } | 1 |
| 3 | 1 | { 3, 5 } | 01 |
| 4 | 3 | { 2, 6 } | 0001 |

Based on the binarization shown in Table 1, 5 GBi indexes are mapped to 5 GBi coding order indexes. FIG. 2 illustrates the signalling of the GBi coding order index. In AMVP, a flag is first signalled to indicate whether the Inter prediction is uni-prediction or bi-prediction. If the Inter prediction is bi-prediction, then an equal weighting flag is signalled to indicate whether the bi-prediction belongs to equal (i.e., GBi coding order index=0) or non-equal weighting (i.e., GBi coding order index=1, 2, 3, or 4) cases. If the equal-weighting flag is equal to 0, then non-equal weighting for GBi coding order index 1, 2, 3, or 4 is signalled based on truncated unary coding as shown in Table 1.

Affine Motion Model

Motion occurs across pictures along temporal axis can be described by a number of different models. Assuming A(x, y) be the original pixel at location (x, y) under consideration, A' (x', y) be the corresponding pixel at location (x', y)) in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = a_0 + a_1 * x + a_2 * y, \text{ and}$$

$$y' = b_0 + b_1 * x + b_2 * y. \quad (3)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector:

$$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases} \quad (4)$$

An example of the four-parameter affine model is shown in FIG. 3, where block 310 corresponds to the current block and block 320 corresponds to the reference block. The transformed block is a rectangular block. The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (5)$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 4 illustrates the neighbouring block set used for deriving the corner-derived affine candidate. As shown in FIG. 4, $\vec{v}_0$ corresponds to a motion vector of the block V0 at the upper-left corner of the current block 410, which is selected from the motion vectors of the neighbouring block a0 (referred as the above-left block), a1 (referred as the inner above-left block) and a2 (referred as the lower above-left block), and the corresponds to motion vector of the block V1 at the upper-right corner of the current block 410, which is selected from the motion vectors of the neighbouring block b0 (referred as the above block) and b1 (referred as the above-right block).

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 410, which is selected from the motion vectors of the neighbouring block c0 (referred as the left block) and c1 (referred as the left-bottom block). In the example of FIG. 4, the neighbouring blocks (a0, a1, a2, b0, b1, b2, c0 and c1) used to construct the control point MVs for affine motion model are referred as a neighbouring block set in this disclosure.

In ITU-T13-SG16-C-1016, an affine Merge mode is also proposed. If current is a Merge PU, the neighbouring five blocks (c0, b0, b1, c1, and a0 blocks in FIG. 4) are checked to determine whether one of them is affine Inter mode or affine Merge mode. If yes, an affine flag is signalled to indicate whether the current PU is affine mode. When the current PU is coded in affine Merge mode, it gets the first block coded with affine mode from the valid neighbour reconstructed blocks. The selection order for the candidate block is from left, above, above right, left bottom to above left (c0→b0→b1→c1→a0) as shown in FIG. 4. The affine parameter of the first affine coded block is used to derive the $v_0$ and $v_1$ for the current PU.

In HEVC, the decoded MVs of each PU are down-sampled with a 16:1 ratio and stored in the temporal MV buffer for the MVP derivation of following frames. For a 16×16 block, only the top-left 4×4 MV is stored in the temporal MV buffer and the stored MV represents the MV of the whole 16×16 block.

Conventional Sub-PU Temporal Motion Vector Prediction (Sub-PU TMVP)

To improve the coding efficiency, a Sub-PU Temporal Motion Vector Prediction (Sub-PU TMVP, also called advanced temporal motion vector prediction, ATMVP) mode is applied in the Merge mode. That is, the Sub-PU TMVP is a Merge candidate for Merge mode. As shown in FIG. 5, unlike the traditional temporal candidate, the Sub-PU TMVP mode partitions the current PU into multiple Sub-PUs, and finds all corresponding temporal collocated motion vectors for each Sub-PU. The current PU of size M×N has (M/P)×(N/Q) sub-PUs, each sub-PU is of size P×Q, which M is divisible by P, and N is divisible by Q. The example in FIG. 5 corresponds to the case that a current PU 510 is divided into 16 sub-PUs (i.e., M/P=4 and N/Q=4). Sub-PU 0 (511) and sub-PU 1 (512) are indicated. The detailed algorithm for sub-PU TMVP is described as follows.

In step 1, for the current PU 510 coded in the sub-PU TMVP mode, an "initial motion vector", denoted as vec_init (523 and 524) is determined for the sub-PUs (521 and 522) of the collocated PU in a temporal collocated picture 520. For example, the vec_init can be the MV of the first available spatial neighbouring block of the current PU 510. In FIG. 5, vec_init_0 523 points to sub-block 525 and vec_init_1 523 points to sub-block 526. Alternatively, the MV of other neighbouring block may also be used as the initial motion vector. Conventionally, the vec_init is the first available candidate among spatial neighbouring blocks. For example, if the first available spatial neighbouring block has L0 and L1 MVs, and LX is the first list for searching collocated information, then the vec_init uses L0 MV when LX=L0, or L1 when LX=L1. The value of LX (L0 or L1) depends on which list (L0 or L1) is better for collocated information. If L0 is better for collocated information (e.g. POC (Picture Order Count) distance closer than L1), then LX is equal to L0, and vice versa. LX assignment can be performed at a slice level, brick level, tile group level, or picture level.

A "collocated picture searching process" then starts. The "collocated picture searching process" is to find a main collocated picture for all sub-PUs in the Sub-PU TMVP mode. The main collocated picture is denoted as main_colpic. Conventionally, it first searches the reference picture selected by the first available spatial neighbouring bloc. Then, in B-Slices, it searches all reference pictures of current picture starting from L0 (or L1), reference index 0, then index 1, then index 2, and so on (increasing index order). If it finishes searching L0 (or L1), then it searches another list. In P-slice, it first searches the reference picture selected by the first available spatial neighbouring block. Then, it searches all reference pictures of current picture of the list starting from reference index 0, then index 1, then index 2, and so on (increasing index order).

During searching, for each searched picture, a process named "availability checking" is performed. The "availability checking" process checks the collocated sub-PU around centre position of the current PU pointed by vec_init_scaled, where vec_init_scaled is the MV with appropriate MV scaling from the vec_init. Various ways can be used to determine the "around centre position". The "around centre position" may correspond to the centre pixel. For example, if the PU size is M*N, the centre is equal to position (M/2, N/2). The "around centre position" may also correspond to the centre sub-PU's centre pixel. The "around centre position" may be the mix of the above two methods depending on the current PU shape. In the "availability checking", if the checking result is an Inter mode, then the availability is true; otherwise (the checking result being an Intra mode), then the availability is false. After "availability checking", if the availability is true, then current searched picture is labelled as the main collocated picture and the searching process finishes. If the availability is true, the MV of the "around centre position" is used and scaled for the current block to derive the "default MV". If the availability is false, then it goes to search next reference picture.

During the "collocated picture searching process", MV scaling is needed when the reference picture of the vec_init is not equal to the original reference picture. The MV scaling process is that, a scaled version of the motion vector is used. The MV is scaled based on the temporal distances between the current picture and the reference picture of the vec_init and the searched reference picture, respectively. After MV scaling, the scaled MV is denoted as vec_init_scaled.

In step 2, for each sub-PU, it further finds collocated location in main_colpic. Assuming the current Sub-PU is Sub-PU i, the collocated location is calculated as shown in follows:

collocated location $x$=Sub-PU_$i$_$x$+vec_init_scaled_$i$_$x$(integer part)+shift_$x$, collocated location $y$=Sub-PU_$i$_$y$+vec_init_scaled_$i$_$y$(integer part)+shift_$y$.

In the above equations, Sub-PU_i_x means horizontal left-top location of sub-PU i inside the current picture (integer location), Sub-PU_i_y means vertical left-top location of sub-PU i inside the current picture (integer location), vec_init_scaled_i_x means horizontal part of vec_init_s- caled_i, which has integer part and fractional part and we only use integer part in the calculation, and vec_init_scaled_i_y means vertical part of vec_init_scaled_i, which has integer part and fractional part and we only use integer part in the calculation. shift_x means a shift value. The shift_x can be half of sub-PU width. shift_y means a shift value. In one example, shift_y can be half of sub-PU height, but other method may also be used.

Finally, in step 3, it finds the motion information temporal predictor for each Sub-PU, which is denoted as SubPU_MI_i, of each Sub-PU. The SubPU_MI_i is the motion information (MI) from collocated_picture_i_L0 and collocated_picture_i_L1 on collocated location x, collocated location y. Here MI is defined as the set of {MV_x, MV_y, reference lists, reference index, and other Merge-mode-sensitive information, such as local illumination compensation flag}. Moreover, in one example, MV_x and MV_y may be scaled according to the temporal distance relation between collocated picture, current picture, and reference picture of the collocated MV. If MI is not available for some Sub-PU, then the MI of Sub-PU around centre position will be used (in another word, the default MV is used). In FIG. 5, the motion vectors for sub-blocks 525 and 526 are labelled as 527 and 528 respectively.

Conventionally, there is only one Sub-PU TMVP candidate in the candidate list.

Spatial-Temporal Motion Vector Prediction (STMVP)

In JEM-3.0 (Chen et al., "*Algorithm Description of Joint Exploration Test Model* 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001), a spatial-temporal motion vector prediction (STMVP) is also included in Merge mode coding. In STMVP, the motion vectors of the sub-CUs are derived recursively following the raster scan order by using the temporal motion vector predictor and spatial neighbouring motion vector. FIG. 6 illustrates the concept of STMVP. Let us consider an 8×8 CU 610 which contains four 4×4 sub-CUs, A, B, C, and D. The neighbouring N×N blocks in the current frame are labeled as a, b, c, and d. The motion derivation for sub-CU A starts by identifying its two spatial neighbours. The first neighbour is N×N block above sub-CU A (block c). If this block c is not available or is Intra coded, the other N×N blocks above sub-CU A are checked (from left to right, starting at block c). The second neighbour is a block to the left of the sub-CU A (block b). If block b is not available or is Intra coded, other blocks to the left of sub-CU A are checked (from top to bottom, starting at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the co-located block at location D is fetched and scaled accordingly. At last, after retrieving and scaling the motion information, all available motion vectors (up to 3) are averaged separately for each reference list. The averaged motion vector is assigned as the motion vector of the current sub-CU.

Redundancy Removal and Additional Motion Candidates

For the Inter mode, Skip mode, and Merge mode, after deriving the spatial motion candidates, a pruning process is performed to check the redundancy among the spatial candidates.

After removing redundant or unavailable candidates, the size of the candidate list can be adjusted dynamically at both the encoder and decoder sides so that the truncated unary binarization can be beneficial for entropy coding of the index. While the dynamic size of candidate list can bring coding gains, it also introduces a parsing problem. Because the temporal motion candidate is included in the candidate list, when one MV of a previous picture cannot be decoded correctly, a mismatch between the candidate list on the encoder side and that on the decoder side may occur and a parsing error of the candidate index will occur. This parsing error can propagate severely, and the rest of the current picture may not be parsed or decoded properly. What is even worse, this parsing error can affect subsequent Inter pictures that may also be used for temporal motion candidates. Therefore, one small decoding error of a MV may cause failures of parsing many subsequent pictures.

In HEVC, in order to solve the parsing problem mentioned above, a fixed candidate list size is used to decouple the candidate list construction and the parsing of the index. Moreover, in order to compensate the coding performance loss caused by the fixed list size, additional candidates are assigned to the empty positions in the candidate list. In this process, the index is coded in truncated unary codes of a maximum length, where the maximum length is transmitted in slice header for the Skip mode and Merge mode and fixed to 2 for the Inter mode.

For the Inter mode, a zero vector motion candidate is added to fill the empty positions in the AMVP candidate list after the derivation and pruning of the two spatial motion candidates and the one temporal motion candidate. As for the Skip mode and Merge mode, after the derivation and pruning of the four spatial motion candidates and the one temporal motion candidate, if the number of available candidates is smaller than the fixed candidate list size, additional candidates are derived and added to fill the empty positions in the Merge candidate list.

Two types of additional candidates are used to fill the Merge candidate list: the combined bi-predictive motion candidate and the zero vector motion candidate. The combined bi-predictive motion candidates are created by combining two original motion candidates according to a predefined order. After adding the combined bi-predictive motion candidates, if the Merge candidate list still has empty position(s), zero vector motion candidates are added to the remaining positions.

Overlapped Block Motion Compensation (OBMC)

Overlapped Block Motion Compensation (OBMC) is a motion compensation technique that estimates a pixel's intensity value based on motion-compensated signals derived from its nearby block motion vectors (MVs). Overlapped Block Motion Compensation technique finds Linear Minimum Mean Squared Error (LMMSE) estimate of a pixel's intensity value based on motion-compensated signals derived from its nearby block motion vectors (MVs). From estimation-theoretic perspective, these MVs are regarded as different plausible hypotheses for its true motion, and to maximize coding efficiency, their weights should minimize the mean squared prediction error subject to the unit-gain constraint.

When High Efficient Video Coding (HEVC) was developed, several proposals were made using OBMC to provide coding gain. Some of them are described as follows.

In JCTVC-C251, OBMC was applied to geometry partition. In geometry partition, it is very likely that a transform block contains pixels belonging to different partitions. In geometry partition, since two different motion vectors are used for motion compensation, the pixels at the partition boundary may have large discontinuities that can produce some visual artefacts, e.g. blocky artefacts. This in turn decreases the transform efficiency. Let the two regions created by a geometry partition be denoted by region 1 and region 2. A pixel from region 1 (2) is defined to be a boundary pixel if any of its four connected neighbours (left, top, right, and bottom) belongs to region 2 (1). FIG. 7 shows an example where grey-shaded pixels belong to the boundary of region 1 (grey region 710) and white-shade pixels belong to the boundary of region 2 (white region 720). The boundary pixel in region 1 is indicated by grey block filled with dots and the boundary pixel in region 2 is indicated by white block filled with dots. If a pixel is a boundary pixel, the motion compensation is performed using a weighted sum of the motion predictions from the two motion vectors. The weights are 3/4 for the prediction using the motion vector of the region containing the boundary pixel and 1/4 for the prediction using the motion vector of the other region. The overlapping boundaries improve the visual quality of the reconstructed video while also providing BD-rate gain.

In JCTVC-F299, OBMC is applied to symmetrical motion partitions. If a coding unit (CU) is partitioned into two 2N×N or N×2N prediction units (PUs), OBMC is applied to the horizontal boundary of the two 2N×N prediction blocks, and to the vertical boundary of the two N×2N prediction blocks. Since those partitions may have different motion vectors, the pixels at partition boundaries may have large discontinuities, which may cause visual artefacts and also reduce the transform/coding efficiency. In JCTVC-F299, OBMC is introduced to smooth the boundaries of motion partition.

FIG. 8A illustrates an example of OBMC for 2N×N partition and FIG. 8B illustrates an example of OBMC for N×2N partition. The dots-filled pixels represent pixels belonging to Partition 0 and blank pixels represent pixels belonging to Partition 1. The overlapped region in the luma component is defined as two rows or two columns of pixels on each side of the horizontal or vertical boundary respectively. For a pixel row or column (i.e., pixels labelled as A in FIG. 8A and FIG. 8B) that is adjacent to the partition boundary (810 or 820), OBMC weighting factors are (3/4, 1/4). In other words, for pixels A in row 812 of Partition 1, MC (motion compensated) pixel $A_1$ is generated based on MV1 of Partition 1 and MC pixel $A_0$ is generated based on MV0 of Partition 0. The OBMC processed pixel A is derived according to (3/4 $A_1$+1/4 $A_0$). Similar derivation applies to OBMC pixels in column 822. For pixels (i.e., pixels labelled as B in FIG. 8A and FIG. 8B) that are two rows or columns away from the partition boundary, OBMC weighting factors are (7/8, 1/8). For chroma components, the overlapped region is defined as one row or one column of pixels on each side of the horizontal or vertical boundary respectively, and the weighting factors are (3/4, 1/4).

In ATMVP, STMVP, affine mode prediction, and the pattern-based motion vector derivation (PMVD) Merge mode, the sub-block motion compensation is applied. A CU/PU is divided into several sub-blocks. Each block can have different reference pictures and different MVs. If the MVs of each sub-block are very diverse, a lot of bandwidth is required for the sub-block motion compensation. When OBMC is applied to a CU without and with sub-block mode, the processes, as shown in FIG. 9A and FIG. 9B respectively, are performed according to JEM software that is used to evaluate the emerging new coding standard (named versatile video coding, VVC) being developed. If current CU is coded without sub-block mode, then the final predictor is generated by using weighted sum of current MC predictor C, OBMC predictor A' from block A, and OBMC predictor B' from block B. If current CU is coded with sub-block mode, then the final predictor is generated by using weighted sum of current MC predictor C, OBMC predictor A' from the above block A, OBMC predictor B' from the left block B, OBMC predictor D' from the right block D, and OBMC predictor E' from the bottom block E. The process of the weighted sum is performed one by one sequentially. This induces high computation complexity and data dependency. In order to simplify the OBMC process, one aspect of the present invention discloses methods to simplify the required computations.

De-Blocking Filter (DF)

High Efficiency Video Coding (HEVC) is a new video coding standard that was finalized in January 2013. HEVC divides a picture into coding tree units (CTU) of 16×16, 32×32, or 64×64 samples. The coding tree unit can be further divided into smaller blocks using a quadtree structure, each of such a block is called a coding unit (CU). A CU can further be split into prediction units (PUs) and is also a root for the transform quadtree of transform units (TUs).

De-blocking filter can be used to alleviate the blocking artefacts caused by the block-based coding. Filtering decisions are made separately for each boundary of four-sample length that lies on the grid dividing the picture into blocks of 8×8 samples. Only boundaries on the 8×8 grid, which are either PU or TU boundaries, are subjected to de-blocking. The boundary samples involved in de-blocking each four-sample length vertical boundary and horizontal boundary are shown in FIG. 10A and FIG. 10B, respectively. Line 1010 in FIG. 10A corresponds to a horizontal boundary and line 1020 in FIG. 10B corresponds to a vertical boundary. A boundary strength (Bs) value is calculated for each four-sample length boundary and can take 3 possible values as defined in Table 2. Luma and chroma components are processed separately in the de-blocking process. For the Luma component, only block boundaries with Bs values equal to 1 or 2 are filtered. In the case of chroma components, only boundaries with Bs value equal to 2 are filtered.

TABLE 2

| Conditions | Bs |
| --- | --- |
| At least one of the blocks is Intra | 2 |
| At least one of the blocks has non-zero coded residual coefficient and boundary is a transform boundary | 1 |
| Absolute differences between corresponding spatial motion vector components of the two blocks are >= 1 in units of inter pixels | 1 |
| Motion-compensated prediction for the two blocks refers to different reference pictures or the number of motion vectors is different for the two blocks | 1 |
| Otherwise | 0 |

For luma component, additional conditions are checked for each four-sample length boundary to determine whether de-blocking filtering should be applied, and to further determine whether a normal filter or a strong filter should be applied if de-blocking is applied.

In the normal filtering mode, two samples at each side of the boundary can be modified. In the strong filtering mode, three samples at each side of the boundary can be modified.

Weighted Prediction (WP)

In HEVC, weighted prediction (WP) can be used to compensate illuminance change between frames. WP apply a weight and an offset to one motion-compensated prediction block. The weights and offset values are signalled at slice level in WP.

BRIEF SUMMARY OF THE INVENTION

A method and apparatus of encoding or decoding for a coding system, wherein bi-directional CU (coding unit) weighting (BCW) is enabled for the coding system to allow using multiple pairs of weights, are disclosed. According to this method, a Merge candidate list is generated for the current block, where current bi-directional CU weights for a bi-directional predictor of the current block associated with a target Merge candidate in the Merge candidate list are set to a pre-define pair of weights when the target Merge candidate corresponds to a selected Merge candidate.

The current block or a current motion information of the current block is encoded or decoded according to the Merge candidate list when Merge mode is selected for the current block.

In one embodiment, the selected Merge candidate corresponds to a sub-block mode, where the current block is partitioned into multiple sub-blocks for motion compensation. The sub-block mode may correspond to ATMVP (Advanced Temporal Motion Vector Prediction) mode. ATMVP is also called subTMVP (subblock TMVP (subblock temporal motion vector predictor)) in the emerging VVC (versatile video coding) being developed. A BCW index corresponding to the current bi-directional CU weights for the bi-directional predictor of the current block associated with the target Merge candidate can be derived as a most frequent BCW index among a collocated centre sub-block and spatial neighbouring sub-blocks of the collocated centre sub-block. In another embodiment, if the Merge candidate is in a sub-block mode, such as ATMVP, STMVP, or Affine mode, the GBi index of the Merge candidate is set to a pre-defined index. For example, GBi index is set to the index indicating the equal weight, which means that both the weight of L0 and L1 list all 0.5.

In another embodiment, the selected Merge candidate corresponds to a temporal Merge candidate. In yet another embodiment, the selected Merge candidate corresponds to a pairwise average Merge candidate. In yet another embodiment, the selected Merge candidate corresponds to a history-based Merge candidate, which is also called history-based motion vector predictor (HMVP). In yet another embodiment, the selected Merge candidate corresponds to a UMVE (Ultimate Motion Vector Expression) Merge candidate, which is also called MMVD (Merge with MVD) in the latest version of the spec for VVC.

In one embodiment, the pre-define pair of weights correspond to (0.5, 0.5), which means in bi-prediction for Merge mode or Inter prediction mode, the weight of predictors from list 0 and list 1 are equal.

Another method and apparatus of encoding or decoding for a coding system, wherein bi-directional CU (coding unit) weighting (BCW) is enabled for the coding system to allow using multiple pairs of weights, are disclosed. According to this method, a Merge candidate list is generated for the current block, where current bi-directional CU weights for a bi-directional predictor associated with a target Merge candidate in the Merge candidate list are inherited from the target Merge candidate when the target Merge candidate corresponds to a selected Merge candidate. The current block or a current motion information of the current block is encoded or decoded according to the Merge candidate list when Merge mode is selected for the current block.

In one embodiment, the selected Merge candidate corresponds to a history-based Merge candidate. In another embodiment, the selected Merge candidate corresponds to a UMVE (Ultimate Motion Vector Expression) Merge candidate.

Yet another method and apparatus of encoding or decoding for a coding system, wherein bi-directional CU (coding unit) weighting (BCW) is enabled for the coding system to allow using multiple pairs of weights, are disclosed. A Merge candidate list, a history-based list (HMVP list), or an affine candidate list is generated for the current block, where whether one new candidate to be inserted in the Merge candidate list, the history-based list (HMVP list), or the affine candidate list is checked before said one new candidate is inserted into the Merge candidate list, the history-based list (HMVP list), or the affine candidate list according to one or more factors including history-based candidate update, affine candidate comparison, motion vector, prediction direction, reference index or a combination thereof and excluding a BCW index associated with a target Merge candidate. The new candidate is not inserted if the new candidate is redundant. The current block or a current motion information of the current block is encoded or decoded according to the Merge candidate list or the affine candidate list when Merge mode or affine Merge mode is selected respectively for the current block; or the history-based list (HMVP list) is updated after the current block is coded in Merge mode or AMVP mode and is referenced during building the Merge candidate list in Merge mode or an AMVP list in AMVP mode.

BRIEF DESCRIPTION OF THE DRAWINGS

FIG. 16 illustrates the W used in equation (7) according to the distance by modifying the three control points to simplify the calculation.

FIG. 17 illustrates an example of the non-zero coefficients in the upper region of current block, where the coefficient coding for the bottom region will be a waste.

FIG. 18 shows an example where only partial coefficients are scanned.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Method 1. GBi Improvement for Signalling

Figure 11:
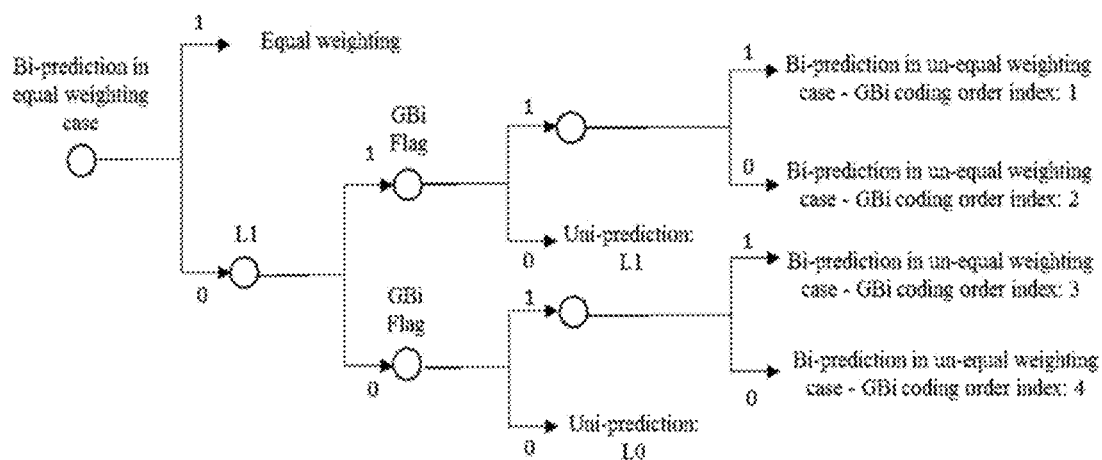
FIG. 11 illustrates an example of signalling of the improved GBi syntax design in AMVP based on the example with the number of GBi index equal to five.

Currently, GBi index is signalled based on truncated unary coding once a flag is signalled to indicate the bi-prediction case. The GBi is also called BCW (Bi-prediction with CU Weight) in the emerging VVC. Another flag signalled afterward to represent the non-equal GBi weighting. In fact, the GBi syntax design can be improved by moving the GBi index signalling from bi-prediction signalling branch to uni-prediction signalling branch to further reduce syntax overhead. FIG. 11 illustrates the signalling of the improved GBi syntax design in AMVP based on the example with the number of GBi index equal to five. The AMVP is also called Inter prediction in the emerging VVC.

In FIG. 11, in AMVP, a flag is first signalled to indicate whether the inter prediction is bi-prediction with equal weighting case or not. If the value of the flag is equal to 1, the inter prediction is bi-prediction in equal weighting case. If the value of the flag is equal to 0, then a flag is signalled to represent whether the prediction is the L0 or L1 case. For both cases, a GBi flag is then signalled to indicate whether the inter prediction is uni-prediction or bi-prediction with un-equal weighting case. For example, if in L0 case and GBi flag is equal to 0, the inter prediction is L0 uni-prediction. If in L0 case and GBi flag is equal to 1, then one more flag is signalled to indicate the GBi coding order index. Since each inter prediction direction (L0 or L1) can signal for two different GBi coding order indices, signalling for all of the four non-equal GBi coding order indices can be all covered in the proposed GBi syntax design. The proposed GBi syntax design has two advantages: (1) shorter codeword (only one-bit) for bi-prediction in equal weighting case, which occurs frequently, and (2) shorter codeword for signalling non-equal GBi coding order indices.

For detailed syntax design, the GBi flag in the example shown in FIG. 11 can be signalled after the signalling of motion information (e.g. reference index, MVD, and MVP) transmission. An example of the signalling steps are shown below:
1. Determining Inter prediction direction (after signalling the flags "Bi-prediction in equal weighting case" and "L1" as shown in FIG. 11).
2. Signalling motion information (e.g. the reference index, MVP index, MVD) for L0, L1, or both based on the Inter prediction.
3. If the Inter prediction is uni-prediction or bi-prediction with non-equal GBi weighting, signalling the GBi flag.
4. If GBi flag is equal to 1, signalling one more bit to indicate the GBi coding order index.

Figure 1:
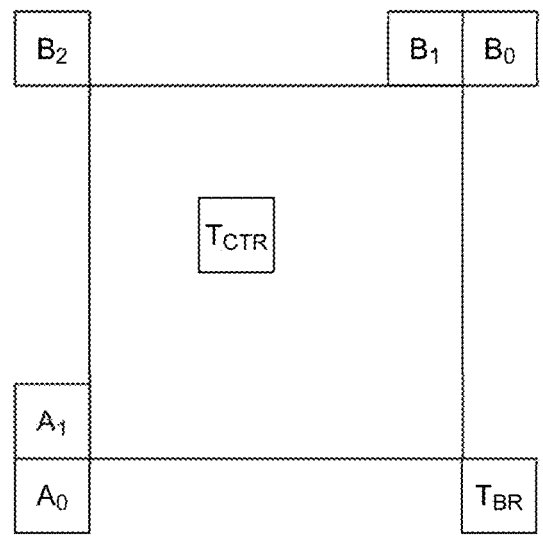
FIG. 1 shows the spatial and temporal neighbouring blocks used to derive candidates for the Merge mode.
Figure 2:
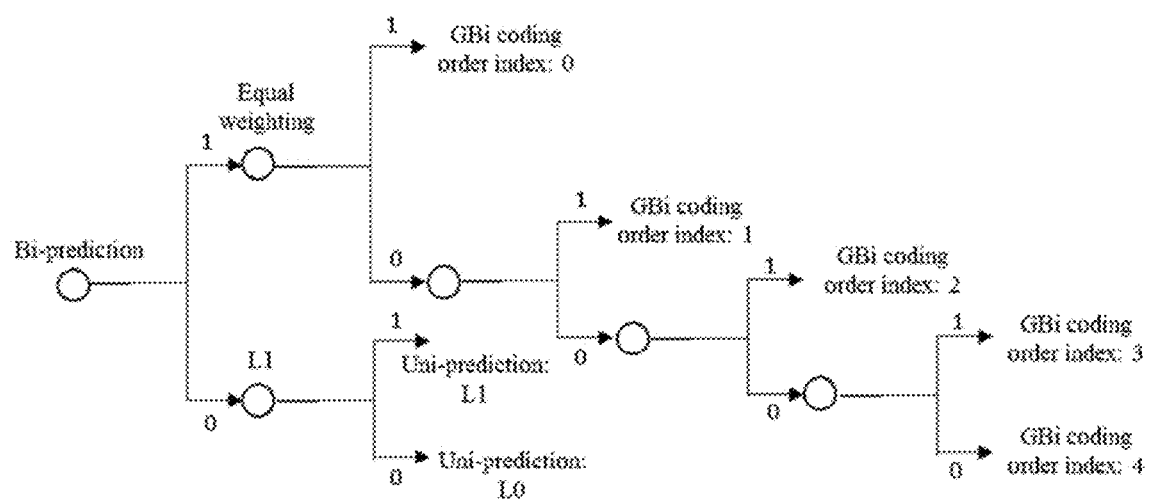
FIG. 2 illustrates the signalling of the GBi (generalized bi-prediction) coding order index.
Figure 3:
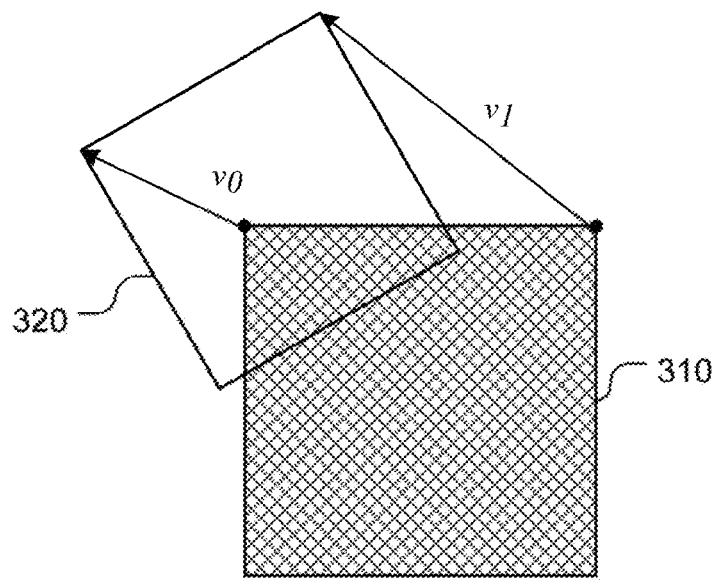
FIG. 3 illustrates an example of four-parameter affine model, where the motion model can be derived based on motion vectors at two control points.

Also, the GBi flag shown in the example of FIG. 11 can be signalled before the signalling of motion information (such as reference index, MVD, and MVP) transmission. The signalling steps are shown below:
1. Determining Inter prediction direction (after signalling the flags "Bi-prediction in equal weighting case" and "L1" shown in FIG. 2).
2. If the Inter prediction is uni-prediction or bi-prediction with non-equal GBi weighting, signalling the GBi flag.
3. If GBi flag is equal to 1, signal one more bit to indicate the GBi coding order index.
4. Signalling motion information (e.g. the reference index, MVP index, MVD) for L0, L1, or both based on the Inter prediction.

Affine MVP Pruning

In both affine Inter and affine Merge mode, if any MVP list is to be constructed, the affine MVP will be pruned by existing MVPs in the list. If affine Inter and affine Merge use separate lists, the to-be-added affine MVP will be pruned with other affine MVPs in the list. However, for affine Merge using a unified list, the to-be-added affine MVP can be not only pruned with existing affine MVPs in the list, but also with other non-affine MVPs in the list.

When one affine MVP is pruned with affine MVPs only, different pruning schemes can be applied. Also, the proposed affine MVP pruning can be applied to separate affine candidate list construction, such as affine AMVP MVP candidate list and/or affine Merge candidate list.

In one embodiment, the pruning can be done by full pruning. In other words, each to-be-added affine MVP will be pruned by all of the existing affine MVPs.

Figure 4:
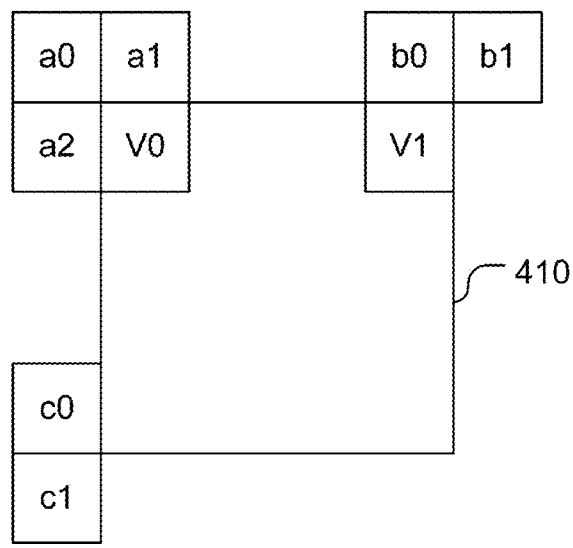
FIG. 4 illustrates the neighbouring block set used for deriving the corner-derived affine candidates.
Figure 5:
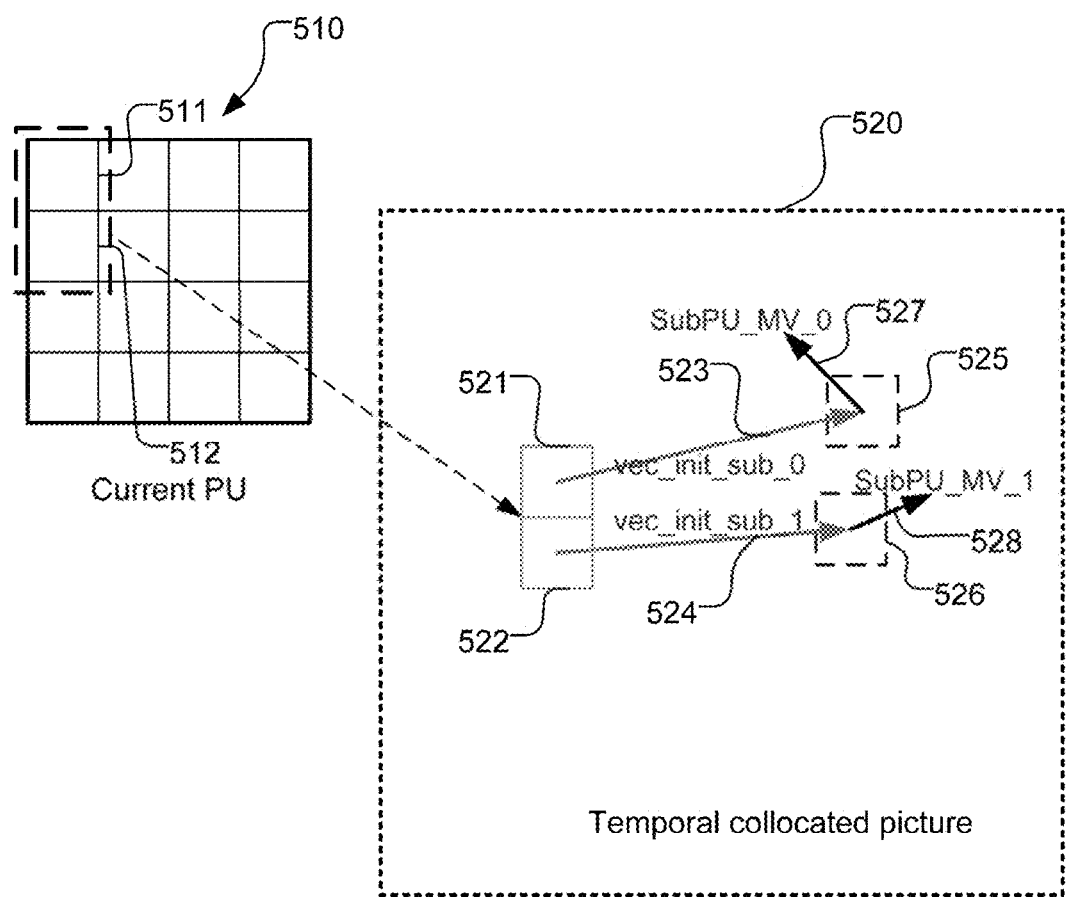
FIG. 5 illustrates a case of Sub-PU temporal motion vector prediction (Sub-PU TMVP) where a current PU is divided into 16 sub-Pus.
Figure 6:
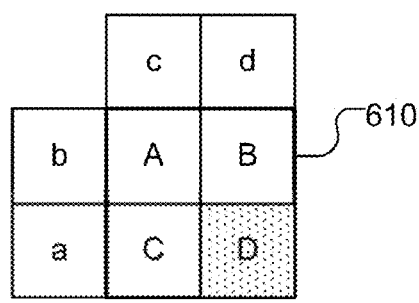
FIG. 6 illustrates the concept of Spatial-temporal motion vector prediction (STMVP).
Figure 7:
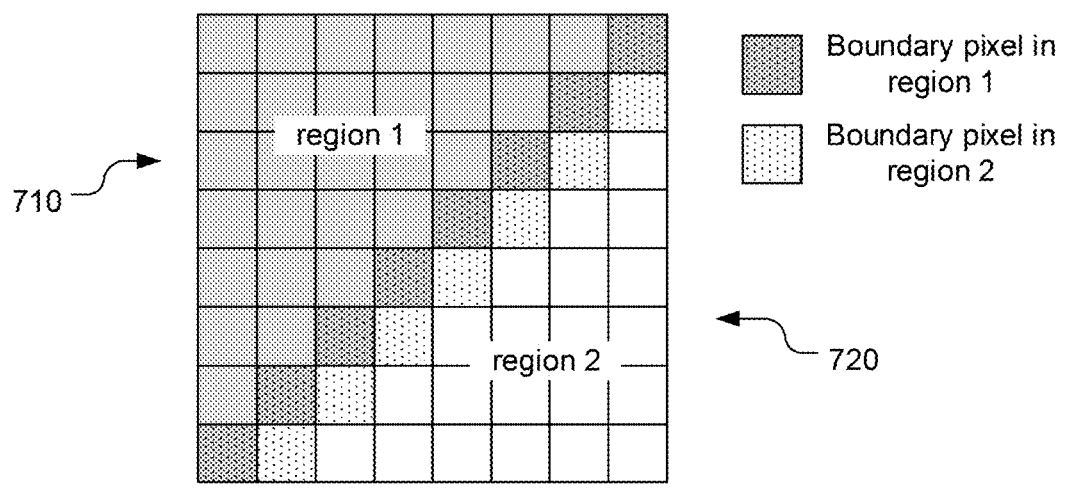
FIG. 7 illustrates an example of Overlapped Block Motion Compensation (OBMC) where grey-shaded pixels belong to the boundary of region 1 and white-shade pixels belong to the boundary of region 2.
Figure 8A:
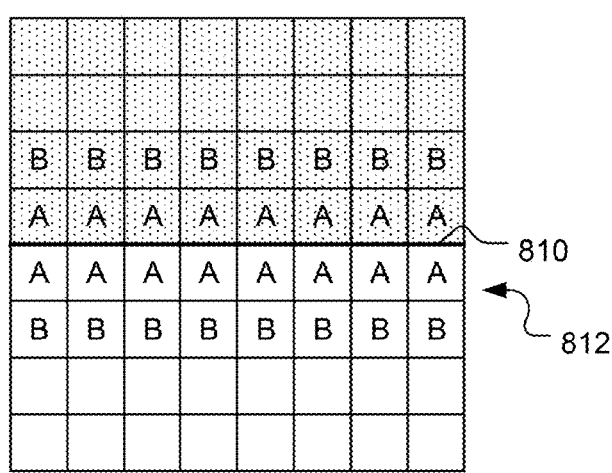
FIG. 8A illustrates an example of Overlapped Block Motion Compensation (OBMC) for 2N×N partition.
Figure 8B:
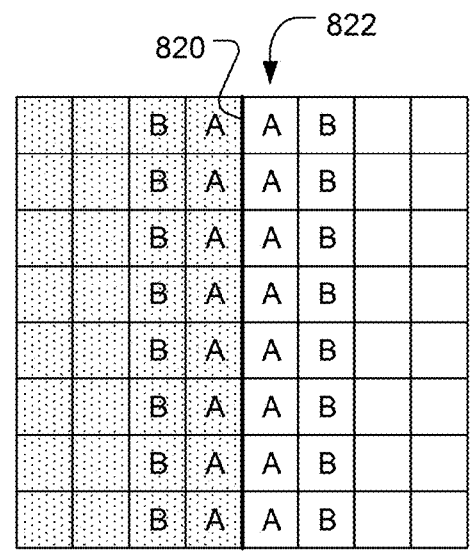
FIG. 8B illustrates an example of Overlapped Block Motion Compensation (OBMC) for N×2N partition.

In another embodiment, the affine MVPs in group B, group C, and group A in FIG. 4 can be firstly pruned in their group, and then the survived candidates in two of the three groups will be pruned by the survived MVP from the third group. For example, affine MVP from C1 will be pruned by the affine MVP from C0, and the affine MVP from B1 will be pruned by the affine MVP from B0. Then, MVP from group B will be pruned by MVP from A0, and MVP from group C will be pruned by MVP from A0. Note that here in group A, only position A0 is searched as in ITU-T13-SG16-C1016.

In another embodiment, the to-be-added affine MVP will only be pruned by a certain MVP in the list. For example, the to-be-added affine MVP will only be pruned by the first affine MVP in the MVP list, the second affine MVP in the MVP list, or the last affine MVP in the MVP list.

In another embodiment, the affine MVPs in one group will only be pruned by the MVPs from one of the other two groups. For example, the MVPs from group C will be pruned by the MVP from group B and the MVPs from group B will be pruned by the MVPs from group A.

In another embodiment, affine MVPs will only be pruned by other MVPs in its own group. For example, the affine MVP from group B will only be pruned by other MVPs from group B, the affine MVP from group C will only be pruned by other MVPs from group C, and the affine MVP from group A will only be pruned by other MVPs from group A.

In another embodiment, the affine MVP of C0 is first put into the list. Then, the affine MVP of B0 is added after. The B0 is compared with C0. Then the affine MVP of B1 is added. The B1 is compared with B0. Then the affine MVP of C1 is added. The C1 is compared with the C0. Then the affine MVP of A0 is added. The A0 is compared with C0 and B0.

The pruning can be done by comparing the similarity of the control points' MVs. In one embodiment, if the MV difference is smaller than a threshold, the to-be-added affine MVP will be pruned. In another embodiment, the to-be-added affine MVP can only be pruned if the MVs of the control points in the two MVPs are the same.

When one affine MVP is pruned by affine MVPs and other non-affine MVPs in the unified Merge list, different pruning schemes can be applied.

In addition to the methods described above, affine MVPs generated by neighbouring blocks can also be pruned by other non-affine MVPs. In one embodiment, if the to-be-added affine MVP's control points' MVs are the same as or similar to one of the existing non-affine MVP, or the difference between the two control points' MVs of the affine MVP for 4-parameter affine model, or three control points of the affine MVP for 6-parameter affine model, is smaller than a threshold, the to-be-added affine MVP will be pruned.

In another embodiment, if one of the existing non-affine MVP is from ATMVP mode, and the reference MVs come from affine blocks, the to-be-added affine MVP will be pruned according to the similarity between the control points of the to-be-added affine MVP and the top-left, top-right, and bottom left MVs using ATMVP mode.

Affine MV Derivation

Figure 12:
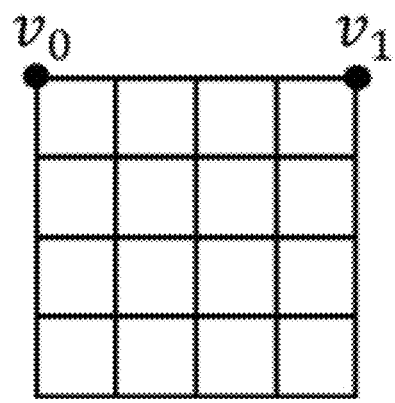
FIG. 12 illustrates the w used in equation (5) according to the conventional affine model, where w is the distance between the two control points.

For affine model with four parameters, the MV for each sub-block can be derived according to equation (5). The w in equation (5) is the distance between the two control points, which is equal to the width of current block since the positions of the two control points are at the corner as shown in FIG. 12. The division can be simply done by shifting because the width of all blocks must be power of two.

Figure 13:
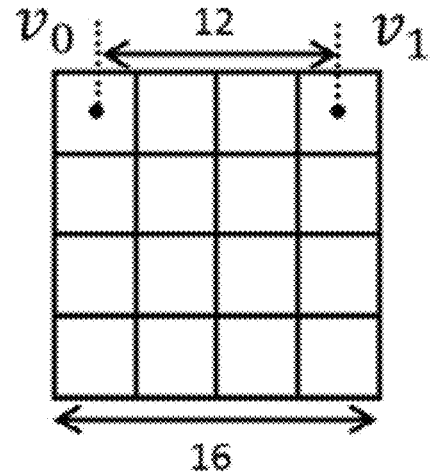
FIG. 13 illustrates the w used in equation (5) according to the distance between the sub-block's centre positions instead of corner points.

However, storing the control points' MV may introduce some errors when the MVs of the control points are being referenced. This is because the control point MV represents the motion at the corner of one sub-block instead of the centre of the sub-block. This problem can be solved by storing MV in the sub-block's centre position instead of corner as shown in FIG. 13. Unfortunately, this may cause high complexity associated with the division operation during deriving the sub-blocks' MV in affine blocks because the distance between the two control points' MVs will become a number not equal to a power of two.

Figure 14:
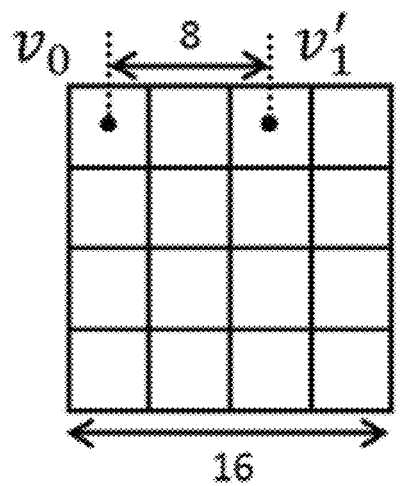
FIG. 14 illustrates the w used in equation (5) according to the distance by changing the position of the second control point to cause the distance between the two control points equal to a power of two.

To solve this problem, it is proposed to change the position of the second control point to make sure the distance between the two control points is equal to a power of two as shown in FIG. 14. After changing the control point's position, the derivation of the sub-block's MV becomes:

$$\begin{cases} v_x = \frac{v'_{1x} - v_{0x}}{W'}x - \frac{v'_{1y} - v_{0y}}{W'}y + v_{0x} \\ v_y = \frac{v'_{1y} - v_{0y}}{W'}x + \frac{v'_{1x} - v_{0x}}{W'}y + v_{0y} \end{cases} \quad (6)$$

In the above equation, $v_1' = (v_{1x}', v_{1y}')$ is the centre MV of the new control point and W' is the new distance between the two control points, which is a power of two.

Similarly, for affine model with six parameters, the MV for each sub-block can be derived by:

$$\begin{cases} v_x = \frac{v_{1x} - v_{0x}}{W}x + \frac{v_{2x} - v_{0x}}{H}y + v_{0x} \\ v_y = \frac{v_{1y} - v_{0y}}{W}x + \frac{v_{2y} - v_{0y}}{H}y + v_{0y} \end{cases} \quad (7)$$

Figure 15:
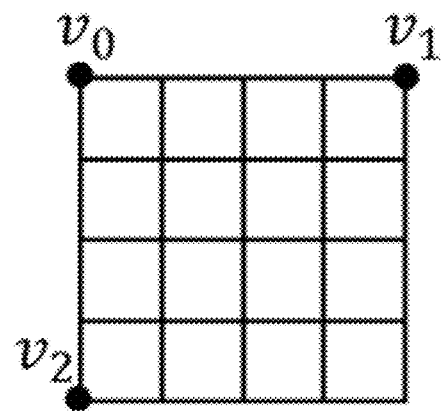
FIG. 15 illustrates the W used in equation (7) according to the conventional affine model, where w is the distance between the three control points.

In the above equation, W is the block width, and $V_0$, $V_1$ and $V_2$ are the three control points' MVs whose position are at the corner of the current block as shown in FIG. 15.

To let the MVs better represent the sub-block when being referenced and also to make sure the division will not become too complicated, the control points' position will be changed as shown in FIG. 16.

After this modification, the sub-block's MV can be derived by:

$$\begin{cases} v_x = \frac{v'_{1x} - v_{0x}}{W'}x + \frac{v'_{2x} - v_{0x}}{H'}y + v_{0x} \\ v_y = \frac{v'_{1y} - v_{0y}}{W'}x + \frac{v'_{2y} - v_{0y}}{H'}y + v_{0y} \end{cases} \quad (8)$$

In the above equation, $v_1' = (v_{1x}', v_{1y}')$ and $v_2' = (v_{2x}', v_{2y}')$ are the centre MVs of the new control points. W' is the new distance between the top-left control point and the top-right control point. H' is the new distance between the top-left control point and the bottom-left control point.

Reference Index Reorder for AMVP Mode

In the present invention, a method to reorder the reference frame index according to the reference frame of the candidate in the Merge list is also disclosed.

Since the Merge candidates with smaller index are chosen more frequently, reference frame in those candidates may also be chosen more frequently in AMVP mode.

In one embodiment, only the reference frame of the first candidate in the Merge list will be reordered to index 0 in AMVP mode. For example, if the reference frame of the first candidate in the Merge list is frame 5 and the original reference frame index of the reference frame is equal to 2, then in AMVP mode, the reference index of frame 5 will be changed to 0 and the reference index for reference frame with original reference index equal to 0 will be changed to 1. The reference index for reference frame with the original reference index equal to 1 will be reorder to 2. In another embodiment, the reference frames of reference indices equal to 0 and 2 are just swapped. For example, if the reference frame of reference index equal to 2 is frame 5, and the reference frame of reference index equal to 0 is frame 3, then the reordered reference index of frame 5 and frame 3 will be 0 and 2 respectively.

In another embodiment, more than one reference frame's reference frame index can be reordered. The reordered index depends on the Merge candidate's Merge index. For example, we use the first three Merge candidates to reorder the reference frame index in AMVP mode. When the reference frames of the first, the second and the third Merge candidates are frames 5, 5 and 3 respectively, then the reference frame index of frame 5 will become 0 and the reference frame index of frame 3 will become 1. In one embodiment, the reference frame index of frame 5 and frame 3 will be first reordered, and the rest of the reference index will be filled by the rest of the reference frame starting from the one with the smallest original reference index. For example, if the original reference index 0, 1, 2, 3 correspond to frame 1, 4, 3, 5, respectively, then the reordered reference index will become reference index 0, 1, 2, 3 corresponds to frame 5, 3, 1, 4, respectively. In another embodiment, the reference frame can only be swapped. For example, if the original reference index 0, 1, 2, 3 correspond to frame 1, 4, 3, 5, respectively, then the reordered reference index will become reference index 0, 1, 2, 3 corresponds to frame 5, 3, 4, 1 (i.e., frames 5 and 1 swapped, frames 3 and 4 swapped), respectively.

Interaction between Affine and Generalized Bi-Prediction

In JVET-K0248 (Y. Su, et al., "CE4.4.1: Generalized bi-prediction for inter coding", in Joint Video Exploration Team (WET) of ITU-T SG 16 WP 3 and ISO/IEC JTC 1/SC 29/WG 11, 11th Meeting: Ljubljana, SI, 10-18 Jul. 2018, Document: WET-K0248), generalized bi-prediction (GBi) is disclosed. The difference between traditional bi-prediction and GBi is that the unequal weights can be applied to L0 and L1 predictors for GBi. For example, we can apply a large weight to L0 and a small weight to L1. The weight selection is explicit signalled to the decoder. Currently, there are five weight sets, including {−2, 10}, {3, 5}, {4, 4}, {5, 3}, and {10, −2} for L0 and L1, respectively. There are some interaction between affine mode and GBi, since bi-prediction can be used in affine mode. Two methods are proposed. The first one is to extend GBi to support affine mode. In this method, the different weights for L0 and L1 can be used when affine mode is used. The other method disallows GBi when affine mode is used. That is, the weight selection is inferred to some pre-defined value and no GBi weight selection is signalled. In one embodiment, the weight selection in affine mode is equal. In another embodiment, the GBi weight is unequal.

Partial Coefficient Coding

Observing that sometimes using diagonal scanning method for coefficient may introduce redundancy when most of the non-zero coefficients appear in a small region. For example, if most of the non-zero coefficients are in the upper region of current block as shown in FIG. 17, the coefficient coding for the bottom region will be a waste. Therefore, according to one embodiment, one coefficient block is partitioned into multiple regions first. Depending on the position of the last coefficient, a flag will be signalled to indicate whether only partial coefficients need to be scanned. For example, one coefficient block is partitioned into four regions. In one example, these four region can be in the same size. If the last coefficient is at the position inside the top-right region, a flag is signalled to indicate whether only the coefficients in the top-left and top-right regions need to be scanned. FIG. 18 shows an example where only partial coefficients are scanned. In another example, if the last coefficient is in the bottom-left region, a flag is signalled to indicate whether only the coefficients in the top-left and bottom-left regions need to be scanned. In another example, if the last coefficient is in the bottom-right region, all coefficients in current block need to be scanned, no additional flag is required. In another embodiment, the current block can be divided into four regions where the four regions can be in different size. The top-left region can be smaller than other three parts, or the area of the top-left+top-right regions is smaller than the area of the bottom-left+bottom-right regions, and/or the area of the top-left+bottom-left regions is smaller than the area of the top-right+bottom-right regions.

In one embodiment, this partial coefficient coding is only applied to Intra predicted blocks. In another embodiment, this partial coefficient coding is only applied to some Intra mode or some Intra MPM mode. In another embodiment, this partial coefficient coding is only applied to Inter predicted block. In another embodiment, this partial coefficient coding is only applied to non-square block. In another embodiment, this partial coefficient coding is only applied to square block. In another embodiment, this partial coefficient coding is only applied to the block size/area/width/height smaller than some threshold. In another embodiment, this partial coefficient coding is only applied to the block size/area/width/height larger than some threshold. In another embodiment, this partial coefficient coding is only applied when using some transform, such as DCT-5/8 and/or DST-7.

Average MVPs or Average Merge Candidates

To improve the coding efficiency, an average motion vector predictor (MVP) or average Merge candidate for Skip, Merge, Direct, and/or Inter modes have been disclosed.

In the proposed average MVP or average Merge candidate, the candidate is generated by averaging the motion information of two or a group of available MVPs or Merge candidates. The group of candidates could be the group of any spatial candidates/MVPs and/or any temporal candidates/MVPs and/or any affine candidates/MVPs and/or any other candidates/MVPs.

The averaged MV calculation in the proposed method can be even weighted or different weighted for average or mean candidates. For example, for a pair with two candidates/MVPs, the weights can be 1 and 1, then divided by 2. Alternatively, the weights could be 2 and −1 or −1 and 2, without the need for division. More generally, the weights can be N1, N2, . . . Nn and then divided by (N1+N2+ . . . +Nn).

In one embodiment, the average candidate is derived as the average of two or a group of MVs pointing to a same reference picture. For example, it searches every pair of candidates in the candidate list base on a predefined order. For each pair, if the two candidates have MVs point to a same reference picture in at least one list, the average candidate could be derived; otherwise, the average candidate could not be derived from that pair. The process to derive the average candidates continues until all the possible pairs have been searched or the candidate list is fully filled in.

In another embodiment, the average candidate is derived as the average of two or a group of the scaled MVs, which are scaled to target reference picture index from two or a group of candidates. For example, the MV for the list 0 or list 1 of the average candidate is derived as the average MV of the list 0 or list 1 MVs from the groups of candidates that are scaled to a target reference-picture index before averaging. The given target reference picture index can be pre-defined, or explicitly transmitted into the bitstream, or implicitly derived from the MVs of the groups of candidates. For example, the target reference-picture index is derived as the majority/minimum/maximum of the reference picture indexes from the groups of candidates. In another embodiment, the average candidate is derived as the average of two or a group of MVs even if they pointing to a different reference picture.

History-Based Merge Mode Construction

The History Based Merge Mode stores some previous CU's Merge candidates in a history array. For the current CU, besides the original Merge mode candidate construction, it can use one or more candidates in the history array to enrich the Merge mode candidates. embodiment detailed description is shown in JVET-K0104 (L. Zhang, et al., "*CE4-related: History-based Motion Vector Prediction*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0104). The history-based method can also apply to AMVP candidate list.

UMVE Prediction

Figure 19A:
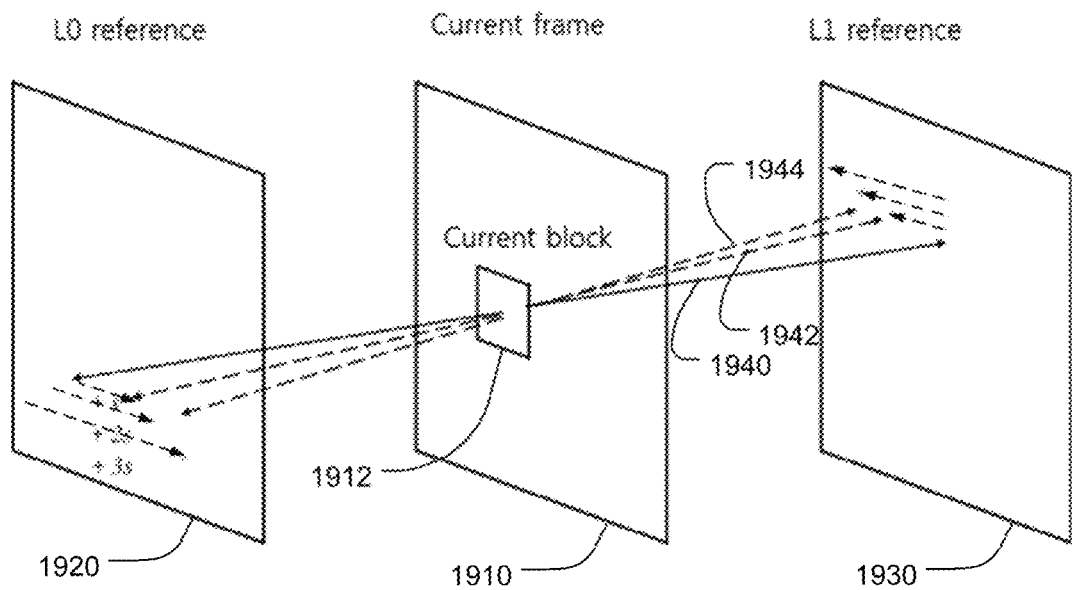
FIG. 19A illustrates an example of UMVE search process for a current block in the current frame.
Figure 19B:
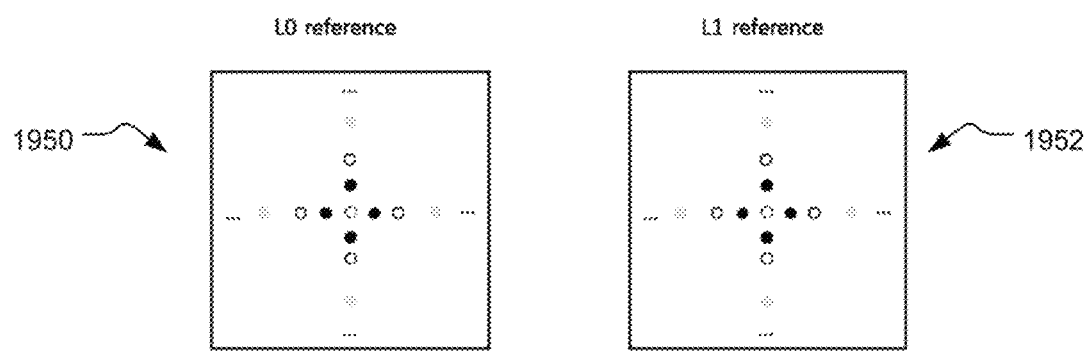
FIG. 19B illustrates an example of UMVE search at specific locations around the centre point vertically and horizontally for L0 reference and L1 reference.

In JVET-K0115 (S. Jeong, et al., "*CE4 Ultimate motion vector expression in J0024 (Test 4.2.9)*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "*Description of SDR, HDR and 360° video coding technology proposal considering mobile application scenario by Samsung, Huawei, GoPro, and HiSilicon*", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. FIG. 19A illustrates an example of UMVE search process for a current block 1912 in the current frame 1910. Frame 1920 in reference list L1 and frame 1930 in reference list L1 correspond to the two reference for bi-prediction. Line 1940 corresponds to a line through the centre of the current block 1912 and two corresponding pixels in frames 1920 and 1930. The search is performed around the centre points associated with line 1940 (e.g. lines 1942 and 1944). In order to simplify the search process, only specific locations around the centre point vertically and horizontally will be searched as shown in FIG. 19B for L0 reference (1950) and L1 reference (1952). UMVE is used for either Skip or Merge modes with a proposed motion vector expression method. UMVE re-uses the same Merge candidate as VVC. Among the Merge candidates, a candidate can be selected, and is further expanded by the proposed motion vector expression method. UMVE provides a new motion vector expression with simplified signalling. The expression method includes prediction direction information, starting point, motion magnitude, and motion direction.

This proposed technique uses a Merge candidate list as is. However, only candidates that are default Merge type (MRG_TYPE_DEFAULT_N) are considered for UMVE's expansion. Prediction direction information indicates a prediction direction among L0, L1, and L0 and L1 predictions. In B slice, the proposed method can generate bi-prediction candidates from Merge candidates with uni-prediction by using mirroring technique. For example, if a Merge candidate is uni-prediction with L1, a reference index of L0 is decided by searching a reference picture in list 0, which is mirrored with the reference picture for list 1. If there is no corresponding picture, the nearest reference picture to the current picture is used. The MV of L0 is derived by scaling MV of L1. The scaling factor is calculated by POC (picture order count) distance.

If the prediction direction of the UMVE candidate is the same as one of the original Merge candidate, the index with value 0 is signalled as an UMVE prediction direction. However, if the prediction direction of the UMVE candidate is not the same as one of the original Merge candidate, the index with value 1 is signalled. After signalling the first bit, remaining prediction direction is signalled based on the pre-defined priority order of UMVE prediction direction. Priority order is L0/L1 prediction, L0 prediction and L1 prediction. If the prediction direction of Merge candidate is L1, Code '0' is signalled for UMVE' prediction direction L1. Code '10' is signalled for UMVE' prediction direction L0 and L1. Code '11' is signalled for UMVE' prediction direction L0. If L0 and L1 prediction lists are the same, UMVE's prediction direction information is not signalled.

Base candidate index defines the starting point. Base candidate index indicates the best candidate among candidates in the list as shown in Table 3.

TABLE 3

| Base candidate IDX | 0 | 1 | 2 | 3 |
|---|---|---|---|---|
| Nth MVP | $1^{st}$ MVP | $2^{nd}$ MVP | $3^{rd}$ MVP | $4^{th}$ MVP |

The distance indices for various distances are shown in Table 4.

TABLE 4

| | Distance IDX | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown in Table 5.

TABLE 5

| Direction IDX | 00 | 01 | 10 | 11 |
|---|---|---|---|---|
| x-axis | + | − | N/A | N/A |
| y-axis | N/A | N/A | + | − |

To reduce the encoder complexity, block restriction is applied. If either width or height of a CU is less than 4, UMVE is not performed.

Pairwise Average Candidate in Merge Mode

In JVET-L090 (Y. Haiso, et al., "*CE4.4.12: Pairwise average candidates*", in Joint Video Exploration Team (WET) of ITU-T SG 16 WP 3 and ISO/IEC JTC 1/SC 29/WG 11, 12th Meeting: Macao, CN, 3-12 Oct. 2018, Document: JVET-L090), pairwise average candidates in Merge mode is proposed. Pairwise average candidates are generated by averaging predefined pairs of candidates in the current Merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

Methods to further improve coding efficiency for GBi index are disclosed as follows.

A. Determining GBi Index for Spatial Candidates in Merge Mode

In one embodiment, if the Merge candidate is a spatial candidate, GBi index is inherited from the spatial Merge candidate. In another embodiment, if the Merge candidate is a spatial candidate, GBi index is not inherited from the spatial Merge candidate. In this case, GBi index can be set to be a pre-defined index. For example, GBi index is set to be the index indicating the equal weight, which means that both the weight of L0 and L1 list are 0.5.

B. Determining GBi Index for Temporal Candidates in Merge Mode

In one embodiment, if the Merge candidate is temporal candidate, GBi index is inherited from the temporal Merge candidate. In another embodiment, if the Merge candidate is temporal candidate, GBi index is not inherited from the temporal Merge candidate. In this case, GBi index can be set to be a pre-defined index. For example, GBi index is set to be the index indicating the equal weight.

C. Determining GBi index for pairwise average candidates in Merge mode

In one embodiment, if the Merge candidate is an average candidate in bi-prediction, GBi index is inherited from the candidate from L0 list. In one embodiment, if the Merge candidate is an average candidate in bi-prediction, GBi index is inherited from the candidate in L1 list. In another embodiment, if the Merge candidate is an average candidate derived from the average of the candidate c0 in L0 and the candidate c1 in L1. If the L1 weight indicted by the GBi index of c0 is larger than the L1 weight indicated by the GBi index of c1, the GBi index of the average candidate is inherited from the candidate c0. In another embodiment, if the Merge candidate is an average candidate, and is derived from the average of the candidate c0 from L0 and the candidate c1 from L1. If the L0 weight indicted by the GBi index of c0 is larger than the L0 weight indicated by the GBi index of c1, the GBi index of the average candidate is inherited from the candidate c0. In another embodiment, if the Merge candidate is an average candidate, GBi index is set to be a pre-defined index. For example, GBi index is set to be the index indicating the equal weight, which means that both the weight of L0 and L1 list are 0.5.

In another embodiment, GBi index is inherited from c0. In another embodiment, GBi index is inherited from c1. In another embodiment, if the L1 weight of c0 is larger than the L1 weight of c1, the GBi index of the average candidate is inherited from the candidate c0, and vice versa. In another embodiment, if the L0 weight of c0 is larger than the L0 weight of c1, the GBi index of the average candidate is inherited from the candidate c0, and vice versa. In another embodiment, if the Merge candidate is average candidate, GBi index is set to be a pre-defined index. For example, GBi index is set to be the index indicating the equal weight, which means that both the weight of L0 and L1 list are 0.5.

D. Determining GBi Index for Combined Candidates in Merge Mode

In the combined Merge candidate mode, two candidate lists are built to form L0 and L1 Merge candidate in bi-prediction. In one embodiment, if the Merge candidate is a combined candidate, GBi index is inherited from the candidate in the Merge candidate list built for L0. In one embodiment, if the Merge candidate is a combined candidate, GBi index is inherited from the Merge candidate list built for L1. In another embodiment, if the Merge candidate is a combined candidate derived from the combination of the candidate c0 in the candidate list built for L0 and the candidate c1 in the candidate list built for L1. If the L1 weight indicted by the GBi index of c0 is larger than the L1 weight indicated by the GBi index is of c1, the GBi index of the average candidate is inherited from the candidate c0. In another embodiment, if the Merge candidate is derived from the combination of the candidate c0 from the candidate list built for L0 and the candidate c1 from the candidate list built for L1. If the L0 weight indicted by the GBi index of c0 is larger than the L0 weight indicated by the GBi index of c1, the GBi index of the average candidate is inherited from the candidate c0. In another embodiment, if the Merge candidate is a combined candidate, GBi index is set to be a pre-defined index. For example, GBi index is set to be the index indicating the equal weight, which means that both the weight of L0 and L1 list are 0.5.

E. Determining GBi Index for Sub-Block Merge Candidates

In one embodiment, if the Merge candidate is in sub-block mode, such as in ATMVP, STMVP, or Affine Merge mode, the GBi index of the Merge candidate can be inherited from the GBi index of the centre sub-blocks of the collocated sub-blocks. In one embodiment, if the Merge candidate is in sub-block mode, such as in ATMVP, STMVP, or Affine mode, the GBi index of the Merge candidate can be derived from the most frequent GBi index occurring in the collocated centre sub-block and the other spatial neighbouring sub-blocks. In another embodiment, if the Merge candidate uses a sub-block mode, such as ATMVP, STMVP, or Affine mode, the GBi index of the Merge candidate is set to be a pre-defined index. For example, GBi index is set to be the index indicating the equal weight, which means that both the weight of L0 and L1 list are 0.5.

F. Determining GBi Index for History-Based Candidate in Merge Mode

In NET-K0104, the History Based Merge Mode stores some previous CU's Merge candidates in a history array, and for the current CU, besides the original Merge mode candidate construction, it can use one or more candidates inside the history array to enrich the Merge mode candidates. In one embodiment, if the CU is inherited from a candidate in the history array, the GBi index of the CU can be inherited from the corresponding candidate in the history array. In another embodiment, if the CU is inherited from a candidate in the history array, the GBi index of the CU is set to be the index indicating the equal weight, which means that both the weight of L0 and L1 list are 0.5.

G. Determining GBi Index in the Pruning Process

In one embodiment, in the pruning process of Merge candidate removal, history-based candidate update or affine candidate comparison, in addition to information related to the reference index, motion vectors, and prediction direction (L0, L1 or bi-prediction), GBi index can be used to determine redundant candidates. In another embodiment, in the pruning process of Merge candidate removal, history-based candidate update or affine candidate comparison, GBi index is not used to determine redundant candidates.

H. Determining GBi Index for UMVE

In JVET-K0115, UMVE re-uses Merge candidate and among the Merge candidates, a candidate can be selected and is further expanded by some motion vector expression methods proposed in JVET-K0115. In one embodiment, the GBi index of the Merge candidate in UMVE mode can be inherited from the corresponding Merge candidate generated in the normal Merge mode. In another embodiment, the GBi index of the Merge candidate in UMVE mode can be set to be the index indicating the equal weight, which means that both the weight of L0 and L1 list are 0.5.

I. Determining GBi Index for OBMC

Figure 9A:
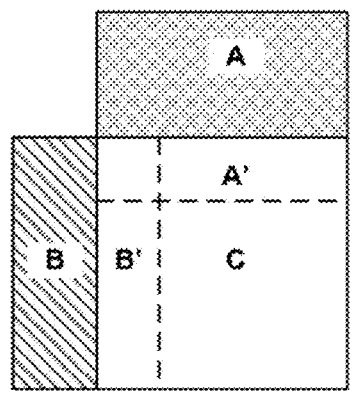
FIG. 9A illustrates an example of OBMC process for a CU without the sub-block mode.
Figure 9B:
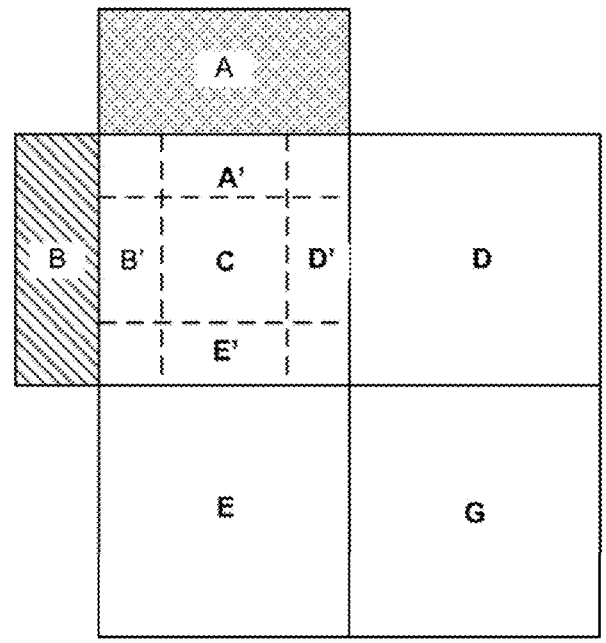
FIG. 9B illustrates an example of OBMC process for a CU with the sub-block mode.
Figure 10A:
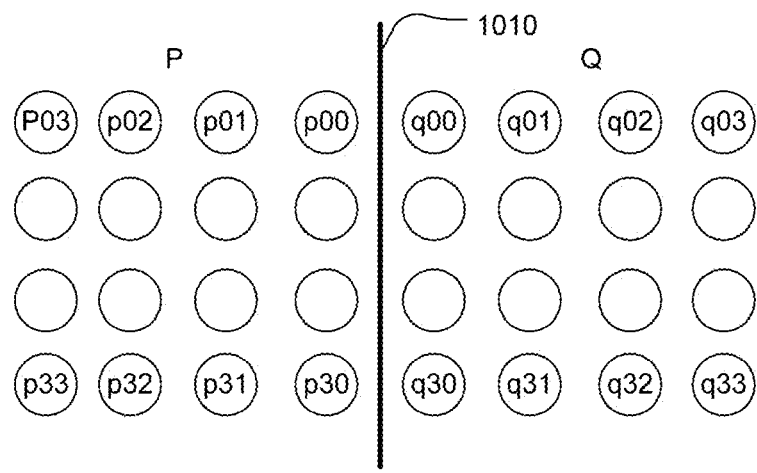
FIG. 10A illustrates an example of the boundary samples involved in de-blocking each four-sample length vertical boundary.
Figure 10B:
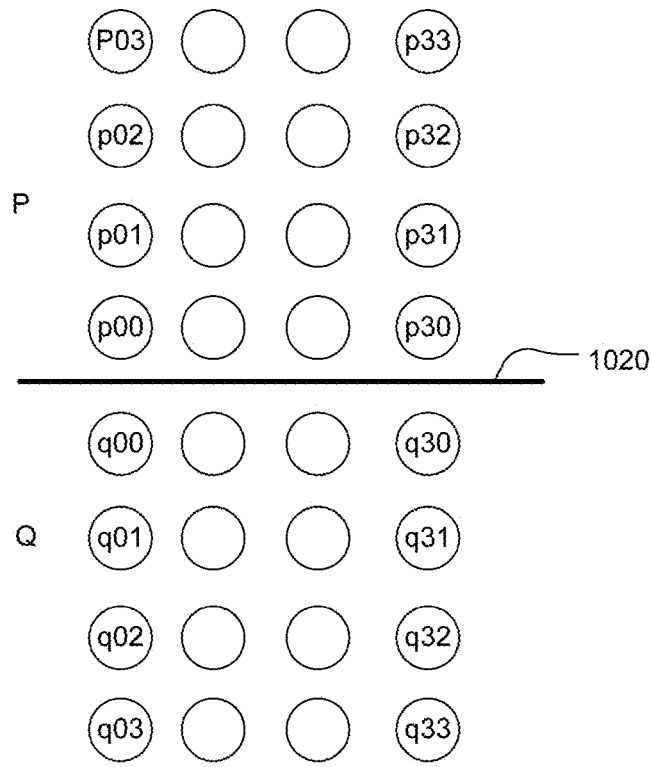
FIG. 10B illustrates an example of the boundary samples involved in de-blocking each four-sample length horizontal boundary.

In one embodiment, the GBi index of a CU in OBMC mode can be inherited from the neighbouring block whose motion vectors are referred to. In another embodiment, when OBMC is applied to a CU without sub-block mode, the GBi indices of OBMC predictors (i.e., A', B' in FIG. 9A) are inherited from the GBi indices of corresponding neighbours (i.e., A and B, respectively in FIG. 9A). In another embodiment, the GBi indices for both A' and B' are not inherited from corresponding neighbours, the GBi indices of A' and B' are set to be a pre-defined index. For example, the GBi indices of A' and B' are set to be the index indicating the equal weight, which means that both the weight of L0 and L1 list are 0.5. In one embodiment, when OBMC is applied to CU with sub-block mode, the GBi indices of all OBMC predictors (i.e., A', B', D', and E' in FIG. 9B) are inherited from the GBi indices of corresponding neighbours (i.e., A, B, D, and E, respectively in FIG. 9B). In another embodiment, the GBi indices for all OMBC predictors are not inherited from corresponding neighbours. The GBi indices of all OMBC predictors' are set to be a pre-defined index. For example, the GBi indices of all OMBC predictors are set to be the index indicating the equal weight, which means that both the weight of L0 and L1 list are 0.5. In another embodiment, GBi is mutually exclusive with OMBC, which means when OBMC is applied on a CU with or without sub-block mode, GBi indices of the MC predictor and all of the OBMC predictors are set to be a pre-defined index. For example, the GBi indices of the MC predictor and all of the OBMC predictors are set to be the index indicating the equal weight, which means that both the weight of L0 and L1 list are 0.5

J. GBi Interaction with De-Blocking Filter

In HEVC, the boundary strength (Bs) value can be determined by comparing the motion vectors or reference indices between boundary pixels of two neighbouring CUs. In one embodiment, GBi indices of two neighbouring CUs are considered to determine the Bs value. For example, if the differences between the GBi indices of two neighbouring CUs are larger than a threshold, the BS value can be set to one or two. For another example, if the differences between the GBi indices of two neighbouring CUs are smaller than a threshold, the Bs value can be set to one or two. In another embodiment, GBi indices of two neighbouring CUs are not considered to determine the Bs value.

K. GBi Interaction with Weighted Prediction

In one embodiment, GBi and WP are mutually exclusive. For example, if WP is applied to a slice, the GBi indices for all of the CUs in the slice are all set to the index indicating the equal weight, which means that both the weight of L0 and L1 list are 0.5. In another embodiment, GBi and WP are mutually inclusive. For example, if WP is applied to a slice, for bi-prediction cases, the weights and offsets of WP are applied to each of the two motion-compensated prediction blocks first, and then the weighted sum of the two refined prediction blocks are calculated based on the GBi weights.

Any of the foregoing proposed methods can be implemented in encoders and/or decoders. For example, any of the proposed methods can be implemented in MV derivation module of an encoder, and/or a MV derivation module of a decoder. Alternatively, any of the proposed methods can be implemented as a circuit coupled to the MV derivation module of the encoder and/or the MV derivation module of the decoder, so as to provide the information needed by the MV derivation module.

Figure 20:
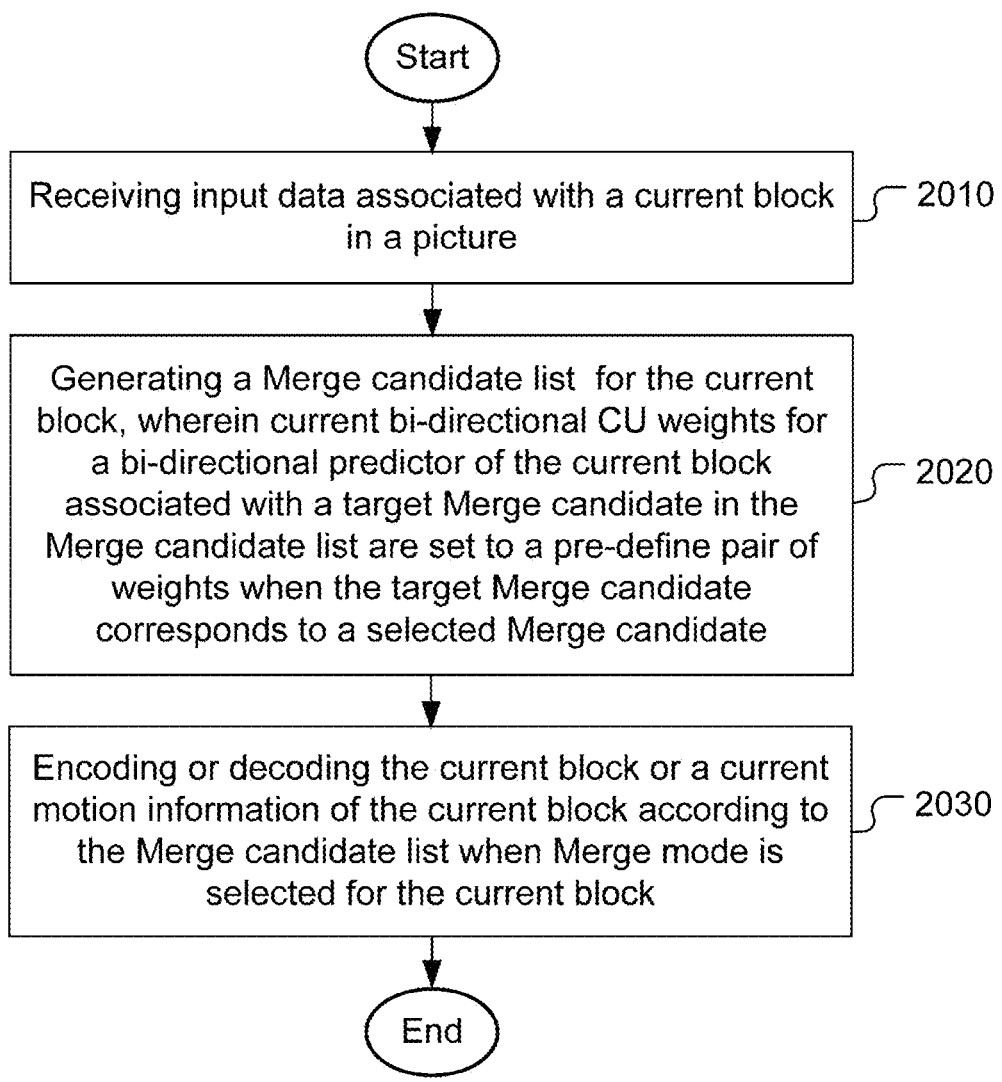
FIG. 20 illustrates a flowchart of an exemplary video coding system, wherein bi-directional CU (coding unit) weighting (BCW) is enabled for the coding system to allow using multiple pairs of weights according to an embodiment of the present invention.

FIG. 20 illustrates a flowchart of an exemplary video coding system, wherein bi-directional CU (coding unit) weighting (BCW) is enabled for the coding system to allow using multiple pairs of weights according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current block in a picture are received in step 2010. A Merge candidate list is generated for the current block in step 2020, where current bi-directional CU weights for a bi-directional predictor of the current block associated with a target Merge candidate in the Merge candidate list are set to a pre-define pair of weights when the target Merge candidate corresponds to a selected Merge candidate. The current block or a current motion information of the current block is encoded or decoded according to the Merge candidate list when Merge mode is selected for the current block in step 2030.

Figure 21:
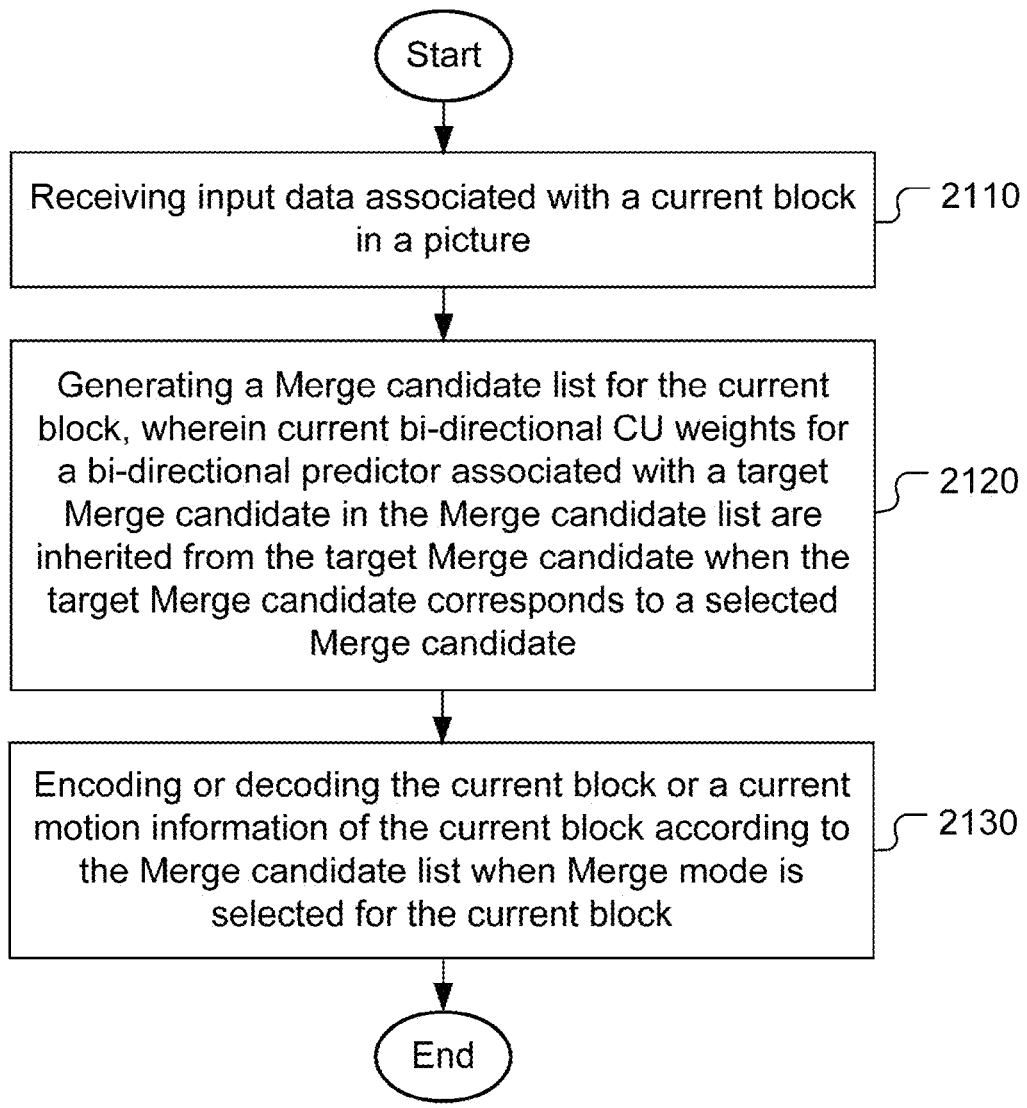
FIG. 21 illustrates a flowchart of another exemplary video coding system, wherein bi-directional CU (coding unit) weighting (BCW) is enabled for the coding system to allow using multiple pairs of weights according to an embodiment of the present invention.

FIG. 21 illustrates a flowchart of another exemplary video coding system, wherein bi-directional CU (coding unit) weighting (BCW) is enabled for the coding system to allow using multiple pairs of weights according to an embodiment of the present invention. According to this method, input data associated with a current block in a picture are received in step 2110. A Merge candidate list is generated for the current block in step 2120, where current bi-directional CU weights for a bi-directional predictor of the current block associated with a target Merge candidate in the Merge candidate list are set to a pre-define pair of weights when the target Merge candidate corresponds to a selected Merge candidate. The current block or a current motion information of the current block is encoded or decoded according to the Merge candidate list when Merge mode is selected for the current block in step 2130.

Figure 22:
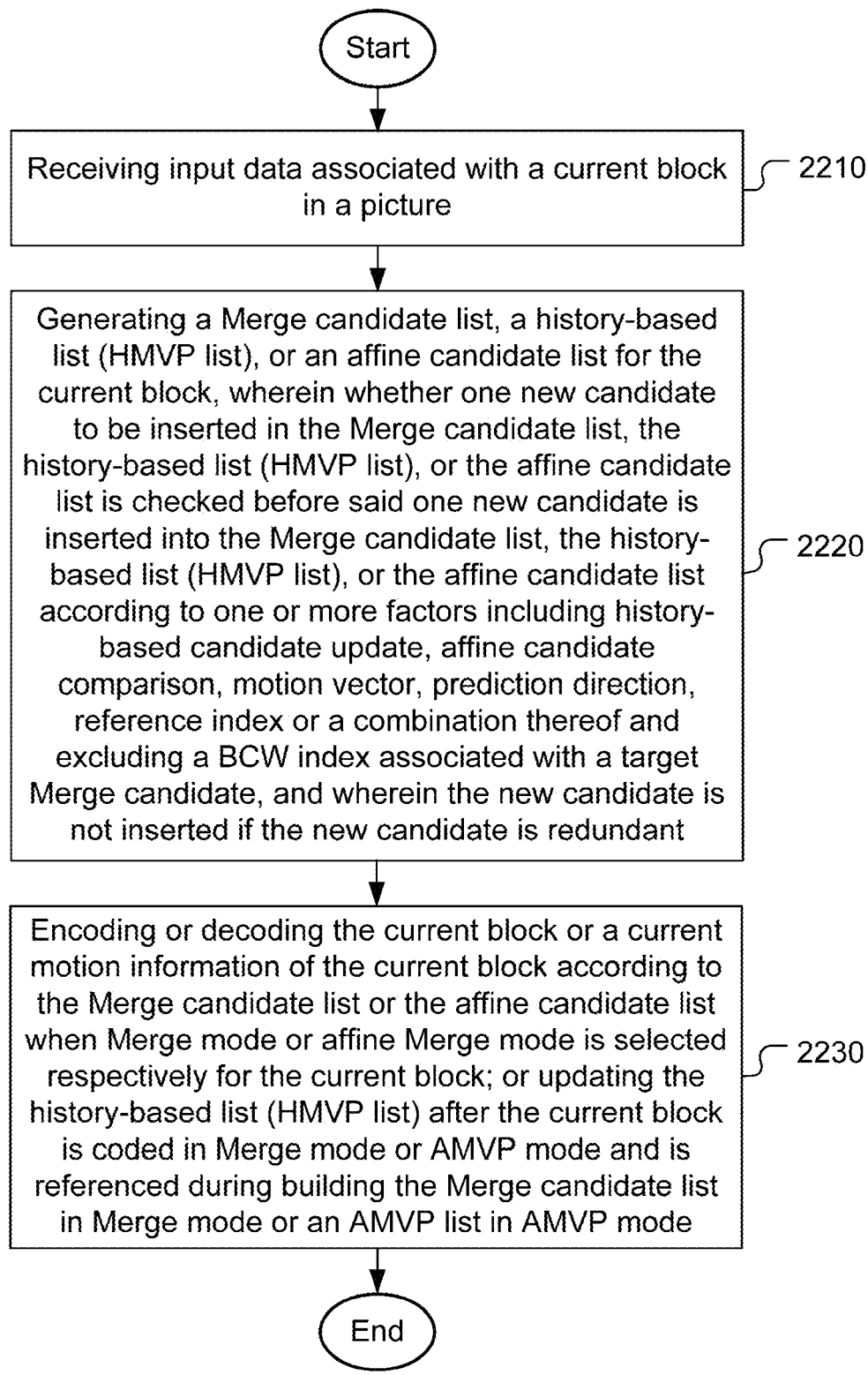
FIG. 22 illustrates a flowchart of yet another exemplary video coding system, wherein bi-directional CU (coding unit) weighting (BCW) is enabled for the coding system to allow using multiple pairs of weights according to an embodiment of the present invention.

FIG. 22 illustrates a flowchart of yet another exemplary video coding system, wherein bi-directional CU (coding unit) weighting (BCW) is enabled for the coding system to allow using multiple pairs of weights according to an embodiment of the present invention. According to this method, input data associated with a current block in a picture are received in step 2210. A Merge candidate list, a history-based list (HMVP list), or an affine candidate list is generated for the current block in step 2210, where whether one new candidate to be inserted in the Merge candidate list, the history-based list (HMVP list), or the affine candidate list is checked before said one new candidate is inserted into the Merge candidate list, the history-based list (HMVP list), or the affine candidate list according to one or more factors including history-based candidate update, affine candidate comparison, motion vector, prediction direction, reference index or a combination thereof and excluding a BCW index associated with a target Merge candidate, and wherein the new candidate is not inserted if the new candidate is redundant. In step 2230, the current block or a current motion information of the current block is encoded or decoded according to the Merge candidate list or the affine candidate list when Merge mode or affine Merge mode is selected respectively for the current block; or the history-based list (HMVP list) is updated after the current block is coded in Merge mode or AMVP mode and is referenced during building the Merge candidate list in Merge mode or an AMVP list in AMVP mode.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding or decoding for a coding system, wherein bi-directional CU (coding unit) weighting (BCW) is enabled for the coding system to allow using multiple pairs of weights, the method comprising:
   receiving input data associated with a current block in a picture;
   generating a Merge candidate list for the current block, wherein when a target Merge candidate associated with current bi-directional CU weights for a bi-directional predictor of the current block in the Merge candidate list corresponds to a temporal candidate or a pair-wise candidate, the bi-directional CU weights are not inherited from weights of the temporal candidate and are set to a pre-defined pair of weights;
   when the target Merge candidate associated with current bi-directional CU weights for a bi-directional predictor of the current block in the Merge candidate list corresponds to a spatial candidate, the bi-directional CU weights are inherited from weights of the spatial candidate; and
   encoding or decoding the current block or a current motion information of the current block according to the Merge candidate list when Merge mode is selected for the current block.

2. The method of claim 1, wherein the pre-define pair of weights correspond to (0.5, 0.5).

\* \* \* \* \*